(12) United States Patent
Wang et al.

(10) Patent No.: US 12,170,631 B2
(45) Date of Patent: Dec. 17, 2024

(54) METHOD AND APPARATUS FOR NEGOTIATING A BLOCK ACKNOWLEDGEMENT AGREEMENT

(71) Applicant: InterDigital Patent Holdings, Inc., Wilmington, DE (US)

(72) Inventors: Xiaofei Wang, Cedar Grove, NJ (US); Hanging Lou, Syosset, NY (US); Monisha Ghosh, Chicago, IL (US); Sudheer A. Grandhi, Pleasanton, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/392,933

(22) Filed: Aug. 3, 2021

(65) Prior Publication Data

US 2021/0367739 A1 Nov. 25, 2021
US 2024/0154767 A9 May 9, 2024

Related U.S. Application Data

(63) Continuation of application No. 17/008,756, filed on Sep. 1, 2020, now Pat. No. 11,082,189, which is a
(Continued)

(51) Int. Cl.
*H04L 5/00* (2006.01)
*H04L 1/00* (2006.01)
(Continued)

(52) U.S. Cl.
CPC .......... *H04L 5/0055* (2013.01); *H04L 1/1607* (2013.01); *H04L 1/1671* (2013.01);
(Continued)

(58) Field of Classification Search
CPC ... H04L 5/0055; H04L 1/1607; H04L 1/1671; H04L 1/1854; H04L 1/1864
See application file for complete search history.

(56) References Cited

U.S. PATENT DOCUMENTS 8,107,493 B2  1/2012 Kwon et al.
8,176,377 B2  5/2012 Parolari
(Continued)

FOREIGN PATENT DOCUMENTS

CN   101502032 A   8/2009
CN   102130753 A   7/2011
(Continued)

OTHER PUBLICATIONS

Cariou et al., "Short Ack," IEEE 802.11-12/0109r0 (Jan. 16, 2012).
(Continued)

*Primary Examiner* — Mohammad S Anwar
(74) *Attorney, Agent, or Firm* — Flaster Greenberg P.C.

(57) ABSTRACT

A method performed by a STA may comprise transmitting a first negotiation message to an AP and receiving a second negotiation message from the AP. The first negotiation message and the second negotiation message may negotiate a block acknowledgement agreement. The method may further comprise receiving a data unit, from the AP, the data unit having a duration field indicating a duration of a block-ACK frame. The duration of the block-ACK frame may be determined based on the negotiated block ACK agreement. A block-ACK frame may be transmitted within the duration indicated by the duration field.

20 Claims, 17 Drawing Sheets

Related U.S. Application Data continuation of application No. 15/962,831, filed on Apr. 25, 2018, now Pat. No. 10,764,014, which is a continuation of application No. 15/430,656, filed on Feb. 13, 2017, now abandoned, which is a continuation of application No. 13/890,833, filed on May 9, 2013, now Pat. No. 9,608,789.

(60) Provisional application No. 61/724,466, filed on Nov. 9, 2012, provisional application No. 61/699,531, filed on Sep. 11, 2012, provisional application No. 61/646,040, filed on May 11, 2012, provisional application No. 61/669,390, filed on Jul. 9, 2012.

(51) Int. Cl.
  *H04L 1/1607* (2023.01)
  *H04L 1/1829* (2023.01)

(52) U.S. Cl.
  CPC .......... *H04L 1/1854* (2013.01); *H04L 1/1864* (2013.01); *H04L 2001/0093* (2013.01)

(56) References Cited

U.S. PATENT DOCUMENTS

| | | | |
|---|---|---|---|
| 8,649,322 | B2 | 2/2014 | Grandhi et al. |
| 8,675,633 | B2 | 3/2014 | Nabetani et al. |
| 8,711,820 | B2 | 4/2014 | Grandhi |
| 8,830,846 | B2 | 9/2014 | Grandhi et al. |
| 8,842,606 | B2 | 9/2014 | Denteneer et al. |
| 9,253,290 | B2 | 1/2016 | Asterjadhi et al. |
| 9,515,925 | B2 | 12/2016 | Wentink et al. |
| 9,686,049 | B2 | 6/2017 | Fischer |
| 9,780,923 | B2 | 10/2017 | Noh et al. |
| 10,244,431 | B2 | 3/2019 | Nakajima et al. |
| 11,082,189 | B2 * | 8/2021 | Wang ............... H04L 1/1864 |
| 2003/0003905 | A1 | 1/2003 | Shvodian |
| 2003/0133427 | A1 | 7/2003 | Cimini, Jr. et al. |
| 2004/0042435 | A1 | 3/2004 | Soomro et al. |
| 2005/0220145 | A1 | 10/2005 | Nishibayashi et al. |
| 2006/0056421 | A1 | 3/2006 | Zaki |
| 2006/0107166 | A1 | 5/2006 | Nanda |
| 2006/0136614 | A1 | 6/2006 | Kakani et al. |
| 2007/0011504 | A1 | 1/2007 | Kim et al. |
| 2007/0037548 | A1 | 2/2007 | Sammour et al. |
| 2007/0110055 | A1 | 5/2007 | Fischer et al. |
| 2008/0049707 | A1 | 2/2008 | Kwon et al. |
| 2008/0137605 | A1 | 6/2008 | Berg |
| 2008/0212612 | A1 | 9/2008 | Singh et al. |
| 2008/0225811 | A1 | 9/2008 | Wentink |
| 2008/0294958 | A1 | 11/2008 | Lee et al. |
| 2009/0310692 | A1 | 12/2009 | Kafle et al. |
| 2010/0008381 | A1 | 1/2010 | Jang et al. |
| 2010/0202347 | A1 | 8/2010 | Sridhara et al. |
| 2010/0260138 | A1 | 10/2010 | Liu et al. |
| 2010/0310003 | A1 | 12/2010 | Lauer et al. |
| 2010/0329197 | A1 | 12/2010 | Boariu et al. |
| 2011/0002219 | A1 | 1/2011 | Kim et al. |
| 2011/0002377 | A1 | 1/2011 | Raveendran |
| 2011/0004796 | A1 | 1/2011 | Hsuan et al. |
| 2011/0035522 | A1 | 2/2011 | Tan et al. |
| 2011/0090855 | A1 | 4/2011 | Kim |
| 2011/0149723 | A1 | 6/2011 | Gong et al. |
| 2011/0164699 | A1 | 7/2011 | Ojard |
| 2011/0194644 | A1 | 8/2011 | Liu et al. |
| 2011/0235593 | A1 | 9/2011 | Gong et al. |
| 2011/0235596 | A1 | 9/2011 | Wentink |
| 2011/0261708 | A1 | 10/2011 | Grandhi |
| 2011/0299516 | A1 | 12/2011 | Kwon |
| 2011/0305176 | A1 * | 12/2011 | Wentink ............... H04W 28/12 370/310 |
| 2012/0014335 | A1 | 1/2012 | Adachi et al. |
| 2012/0076179 | A1 | 3/2012 | Stacey et al. |
| 2012/0087358 | A1 | 4/2012 | Zhu et al. |
| 2012/0230200 | A1 | 9/2012 | Wentink |
| 2012/0230317 | A1 | 9/2012 | Kim et al. |
| 2012/0250618 | A1 | 10/2012 | Abraham et al. |
| 2012/0314697 | A1 | 12/2012 | Noh et al. |
| 2013/0094437 | A1 | 4/2013 | Bhattacharya |
| 2013/0170345 | A1 | 7/2013 | Merlin |
| 2013/0170411 | A1 | 7/2013 | Vermani et al. |
| 2013/0172035 | A1 | 7/2013 | Wentink |
| 2013/0223338 | A1 | 8/2013 | Asterjadhi et al. |
| 2013/0272198 | A1 | 10/2013 | Azizi et al. |
| 2015/0327121 | A1 * | 11/2015 | Li ..................... H04W 28/12 370/328 |
| 2017/0150493 | A1 * | 5/2017 | Seok .................... H04B 7/0452 |
| 2017/0171723 | A1 | 6/2017 | Adachi |

FOREIGN PATENT DOCUMENTS

| | | |
|---|---|---|
| CN | 102271030 A | 12/2011 |
| CN | 102316013 A | 1/2012 |
| CN | 102598769 A | 7/2012 |
| CN | 102845101 A | 12/2012 |
| EP | 1 780 926 | 5/2007 |
| EP | 2 437 428 | 4/2012 |
| JP | 2009164751 A | 7/2009 |
| JP | 2010538514 A | 12/2010 |
| WO | 99/52302 | 10/1999 |
| WO | 2010/148076 A1 | 12/2010 |
| WO | 11/068985 | 6/2011 |
| WO | 11/072085 | 6/2011 |
| WO | 12/019050 | 2/2012 |

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHZ, IEEE P802.11ac/D1.0 (May 2011).

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: TV White Spaces Operation, IEEE P802.11af/D1.06 (Mar. 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.Nov. 2012 (Mar. 29, 2012).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 8: Medium Access Control (MAC) Quality of Service Enhancements, IEEE Std. 802.11e-2005 (Nov. 2005).

Liu et al., "Early ack indication," IEEE 802.11-12/0119r00 (Jan. 2012).

Liu et al., "Short Ack," IEEE 802.11-12/0324r2 (Mar. 2012).

Park, "Proposed Specification Framework for TGah," IEEE P802.11 Wireless LANs, IEEE 802.11-11/1137r5 (Jan. 2012).

Tong et al., "802.11ah Multi-User Aggregation PDU," IEEE 802.11-12/0890r0 (Jul. 2012).

Wong et al., "Proposed TGah Draft Amendment," IEEE P802.11 Wireless LANs, IEEE 802.11-13/0500r0 (May 2013).

(56) References Cited

OTHER PUBLICATIONS

Richard Van Nee (Qualcomm), Strawmodel 802.11ac Specification Framework, IEEE 802.11-09/0633r0, IEEE mentor, May 14, 2009, 28 pages.

* cited by examiner

| Order | Information |
|---|---|
| 1 | Category |
| 2 | Block Ack Action |
| 3 | Dialog Token |
| 4 | Block Ack Parameter Set |
| 5 | Block Ack Timeout Value |
| 6 | Block Ack Starting Sequence Control |

- 2002
- 2004
- 2006

| Order | Information |
|---|---|
| 1 | Category |
| 2 | Block Ack Action |
| 3 | Dialog Token |
| 4 | Status Code |
| 5 | Block Ack Parameter Set |
| 6 | Block Ack Timeout Value |

FIG. 21

| Order | Information |
|---|---|
| 1 | Category |
| 2 | Block Ack Action |
| 3 | DELBA Parameter Set |
| 4 | Reason Code |

FIG. 22

METHOD AND APPARATUS FOR NEGOTIATING A BLOCK ACKNOWLEDGEMENT AGREEMENT

CROSS REFERENCE TO RELATED APPLICATIONS

This application is a continuation of U.S. patent application Ser. No. 17/008,756 filed Sep. 1, 2020, which is a continuation of U.S. patent application Ser. No. 15/962,831 filed Apr. 25, 2018, which issued as U.S. Pat. No. 10,764,014 on Sep. 1, 2020, which is a continuation of U.S. patent application Ser. No. 15/430,656 filed Feb. 13, 2017, which is a continuation of U.S. patent application Ser. No. 13/890,833 filed May 9, 2013, which issued as U.S. Pat. No. 9,608,789 on Mar. 28, 2017, which claims the benefit of U.S. provisional application Nos. 61/646,040 filed May 11, 2012, 61/669,390 filed Jul. 9, 2012, 61/699,531 filed Sep. 11, 2012, and 61/724,466 filed Nov. 9, 2012, the contents of which are hereby incorporated by reference herein.

BACKGROUND

A wireless local area network (WLAN) in the infrastructure basic service set (BSS) mode has an access point (AP) for the BSS, and one or more stations (STAs) associated with the AP. The AP typically has access or interface to a distribution system (DS) or another type of wired or wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS is really peer-to-peer traffic. The peer-to-peer traffic may be sent directly between the source and destination STAs with a direct link setup (DLS) using an IEEE 802.11e DLS or an IEEE 802.11z tunneled DLS (TDLS). A WLAN in an independent BSS mode (IBSS) has no AP and STAs communicate directly with each other.

In the current IEEE 802.11 infrastructure mode of operation, the AP transmits a beacon on a channel called primary channel. The primary channel is 20 MHz wide and is the operating channel of the BSS. This channel is also used by the STAs to establish a connection with the AP. The channel access mechanism in an 802.11 system is carrier sense multiple access with collision avoidance (CSMA/CA). In this mode of operation, every STA, including the AP, will sense the primary channel and if the channel is detected to be busy, the STA and the AP backs off. Hence one STA (including AP) can transmit at any given time in a given BSS.

In IEEE 802.11n, high throughput (HT) STAs may also use 40 MHz wide channel for communication. This is achieved by combining the primary 20 MHz channel with another adjacent 20 MHz channel to form a 40 MHz wide channel.

In IEEE 802.11ac, very high throughput (VHT) STAs can support 40 MHz, 80 MHz and 160 MHz wide channels. While 40 MHz and 80 MHz channels are formed by combining contiguous 20 MHz channels similar to IEEE 802.11n, 160 MHz channel may be formed either by combining 8 contiguous 20 MHz channels or two non-contiguous 80 MHz channels (80+80 configuration).

The channel operating bandwidth may be reduced for sub 1 GHz modes of operation, which is supported in IEEE 802.11af and IEEE 802.11ah. 802.11af supports 2 MHz, 4 MHz, and 8 MHz bandwidths for operation in TV white space (TVWS). 802.11ah supports 1 MHz, 2 MHz, 4 MHz, 8 MHz, and 16 MHz bandwidths for operation in non-TVWS. Some STAs in 802.11ah are considered to be sensors with limited capabilities, and may support a 1 MHz transmission mode.

SUMMARY

A method and apparatus for transmitting acknowledgements in response to data packets in wireless communication are disclosed. A recipient may receive a plurality of data packets from a plurality of stations and transmit acknowledgements for the data packets to the originating stations in a single transmission. The acknowledgements may be transmitted using multi-user multiple-input multiple-output (MU-MIMO). The acknowledgements may be delayed in time after receiving the data packets. The acknowledgements may be transmitted based on an agreed schedule, solicited by the stations, or transmitted without solicitation once a predetermined number of data packets are received.

Alternatively, the acknowledgements may be aggregated and transmitted in the single transmission. The acknowledgements may be aggregated in an a medium access control (MAC) service data unit domain, in a MAC protocol data unit domain, or in a physical layer convergence protocol (PLCP) protocol data unit (PPDU) domain.

A short acknowledgement (ACK) frame may be sent in response to a received frame. The short ACK frame may include an ACK sequence corresponding to a sequence ID included in the received frame. The short ACK frame may include a short training field (STF) and the ACK sequence. The short ACK frame may be transmitted with a short ACK indication. The short ACK frame may be sent in response to an indication included in the received frame.

A method and apparatus for operation by an access point (AP) is provided. The method may comprise receiving a first frame from a first STA, the first frame including first data and receiving a second frame from a second STA, the second frame including second data. In response to the receiving, an ACK frame may be transmitted to the first STA and to the second STA. The ACK frame may be addressed to a broadcast address and include a field which indicates whether the ACK frame is a multiple traffic identifier (multi-TID) block ACK frame format or another ACK frame format.

A method performed by a STA may comprise transmitting a first negotiation message to an AP and receiving a second negotiation message from the AP. The first negotiation message and the second negotiation message may negotiate a block acknowledgement agreement. The method may further comprise receiving a data unit, from the AP, the data unit having a duration field indicating a duration of a block acknowledgement (block-ACK) frame. The duration of the block-ACK frame may be determined based on the negotiated block ACK agreement. A block-ACK frame may be transmitted within the duration indicated by the duration field.

BRIEF DESCRIPTION OF THE DRAWINGS

A more detailed understanding may be had from the following description, given by way of example in conjunction with the accompanying drawings wherein:

FIG. 21 shows a conventional ADDBA Response frame action field format;

FIG. 22 shows a conventional DELBA frame;

DETAILED DESCRIPTION

Figure 1A:
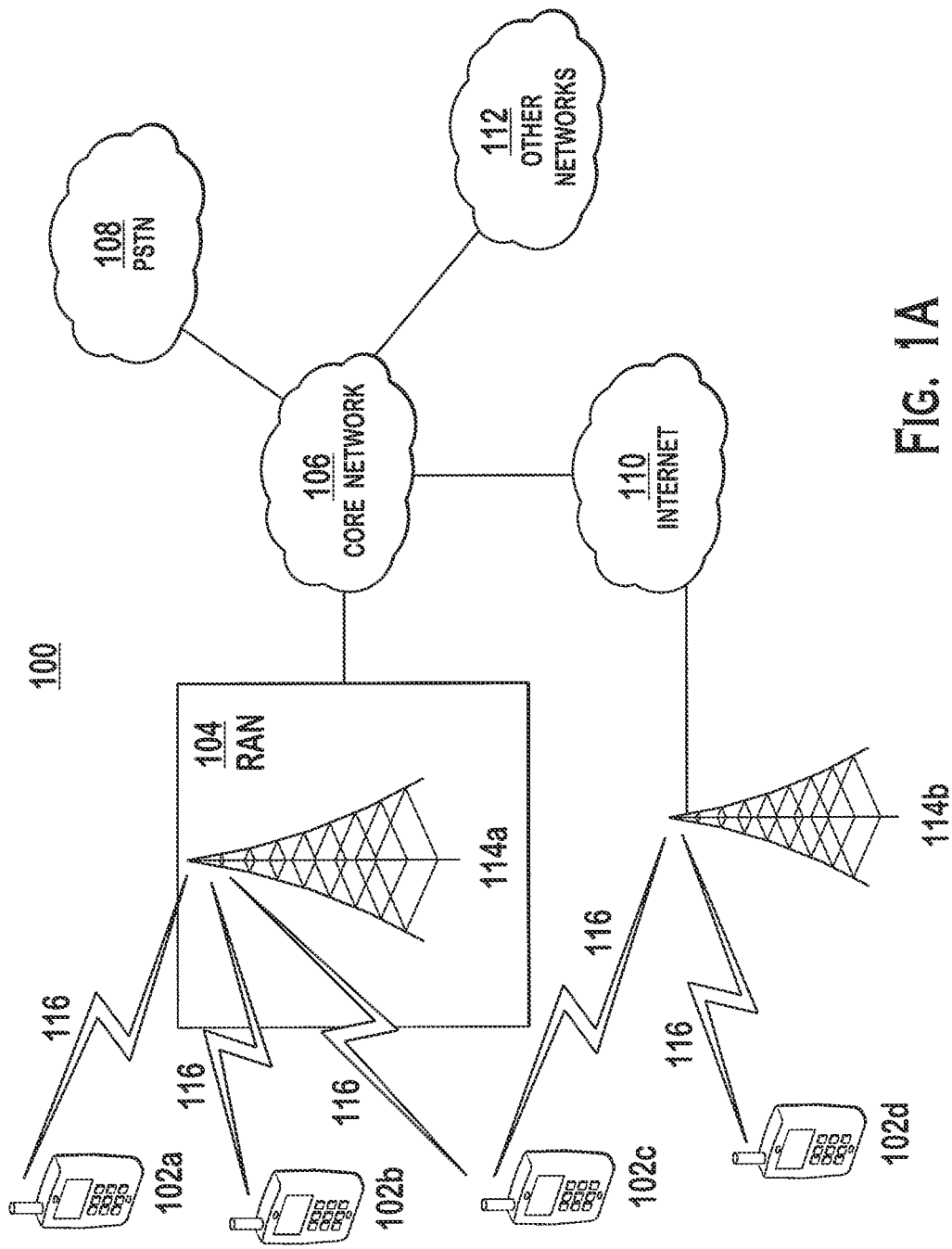
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
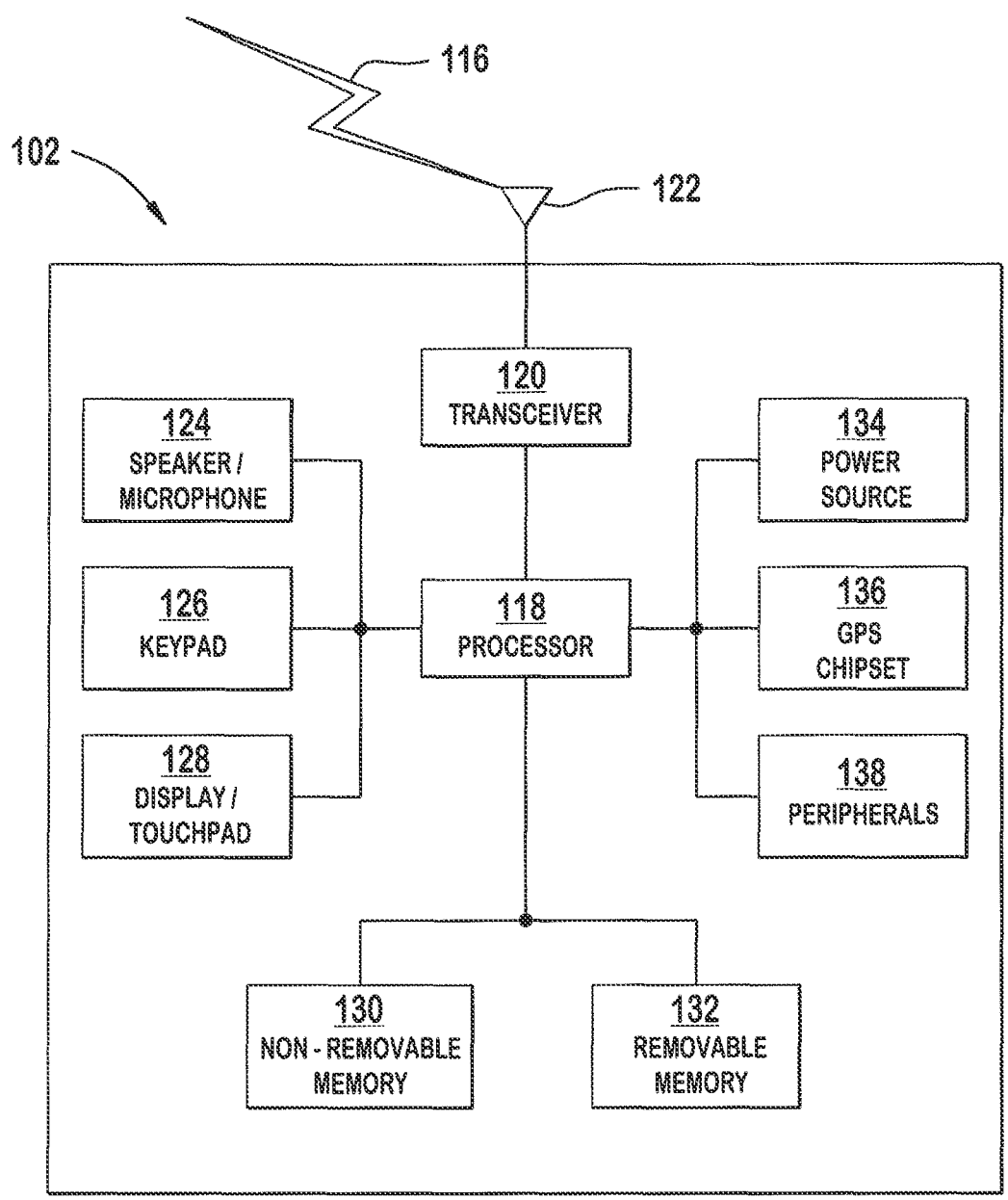
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth© module, a frequency modulated (FM) radio unit, a digital music player, a media player, a video game player module, an Internet browser, and the like.

Figure 1C:
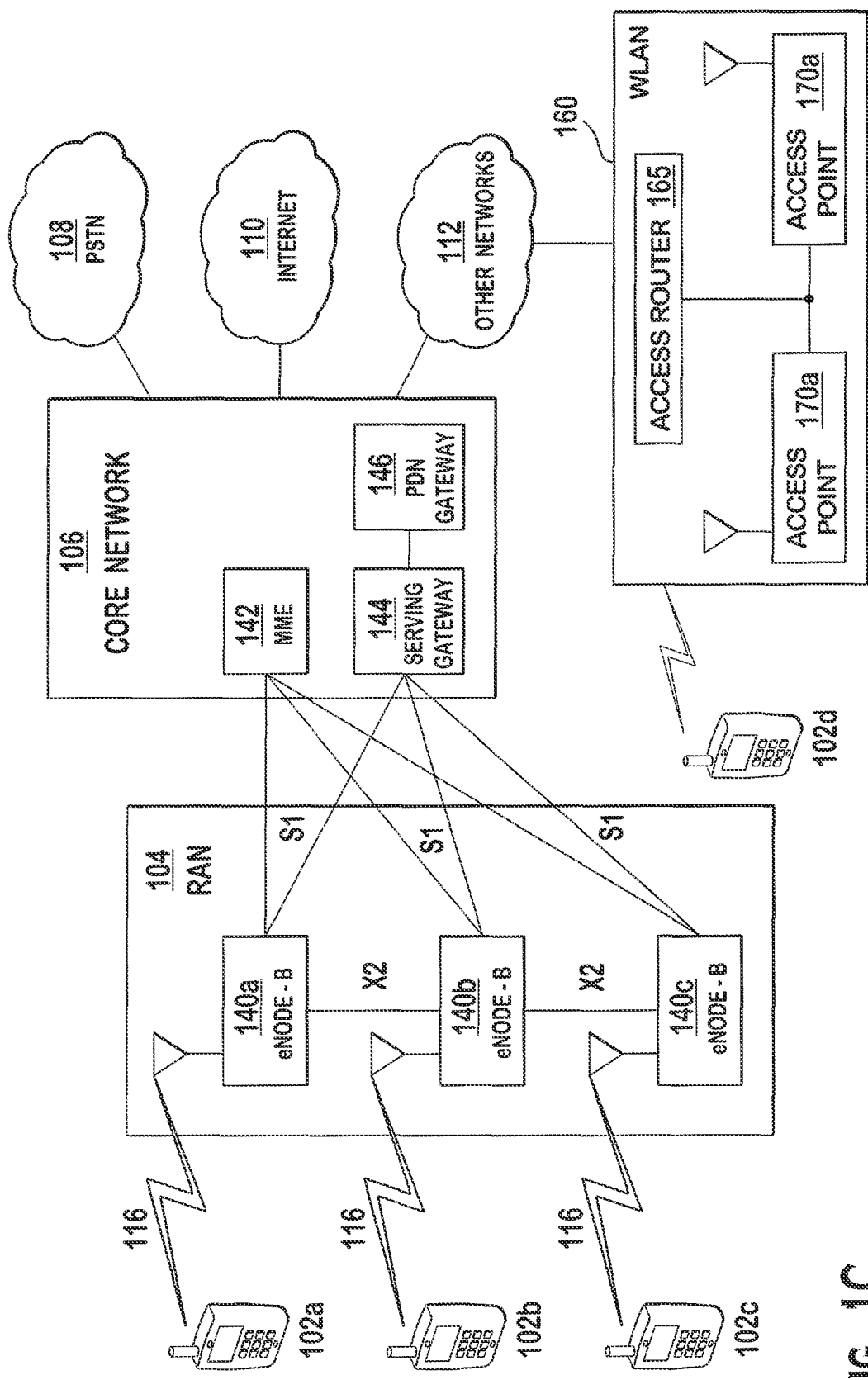
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

Hereafter, the terminologies "short frame" and "null data packet" (NDP) will be used interchangeably. A short frame (such as short ACK, short block ACK, short clear-to-send (CTS), short probe request, etc.) is a physical layer convergence protocol (PLCP) protocol data unit (PPDU) that carries no data field. Hereafter, the term "STA" (e.g., WTRU) may include a non-AP station or an AP station. The embodiments disclosed herein may be implemented by either a non-AP STA or an AP station (an AP). Embodiments disclosed hereafter may be applied to any IEEE 802.11 systems and any other wireless communication systems.

Wireless transmissions can be erroneous even though protection mechanisms such as channel coding, and interleaving, are utilized to protect the transmission. Therefore, mechanisms for acknowledgement of correct packet reception have been introduced in WLAN systems. The STA/AP which successfully receives a data frame addressed to itself sends a positive acknowledgement. If a STA/AP transmitting a frame does not receive an ACK within a prescribed amount of time, it may assume that the data frame was not received correctly and retransmit it. Not all data frames can be acknowledged in this way. The 802.11 standard also supports "no ACK" when the originator indicates that no acknowledgement is expected explicitly from the recipient of the data frame.

A block ACK was introduced in the 802.11e amendment. A block ACK improves the system efficiency by allowing the recipient of multiple frames to transmit a single block ACK to acknowledge a block of data frames. The block ACK may be an immediate block ACK or a delayed block ACK.

Figure 2:
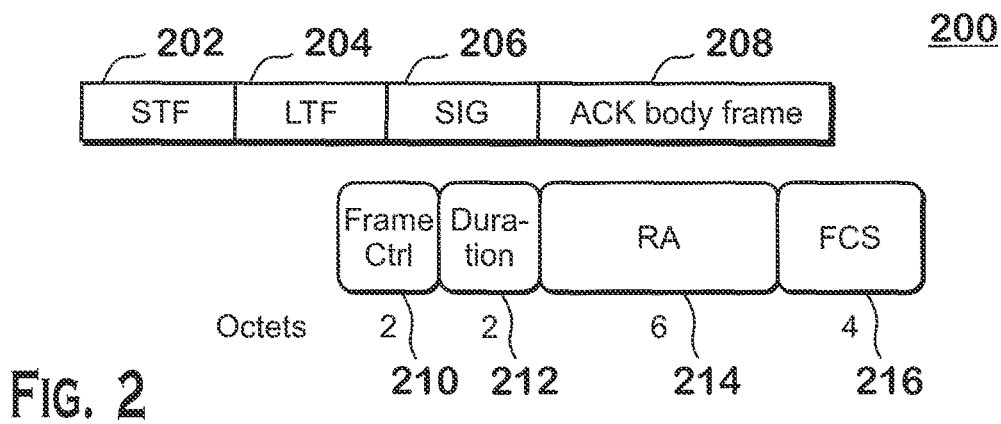
FIG. 2 shows a conventional acknowledgement (ACK) frame.

FIG. 2 shows a conventional ACK frame 200. A conventional ACK frame 200 has a PLCP preamble, which includes a short training field (STF) 202 and a long training field (LTF) 204, a signal (SIG) field 206, and an ACK body frame 208. The ACK body frame 208 has a 2-byte frame control field 210, a 2-byte duration field 212, a 6-byte receiver address (RA) field 214, and a 4-byte frame check sequence (FCS) 216. Information carried by the frame control field 210 indicates that this is an ACK frame. The RA field 214 indicates the originator of the data exchange session.

Figure 3:
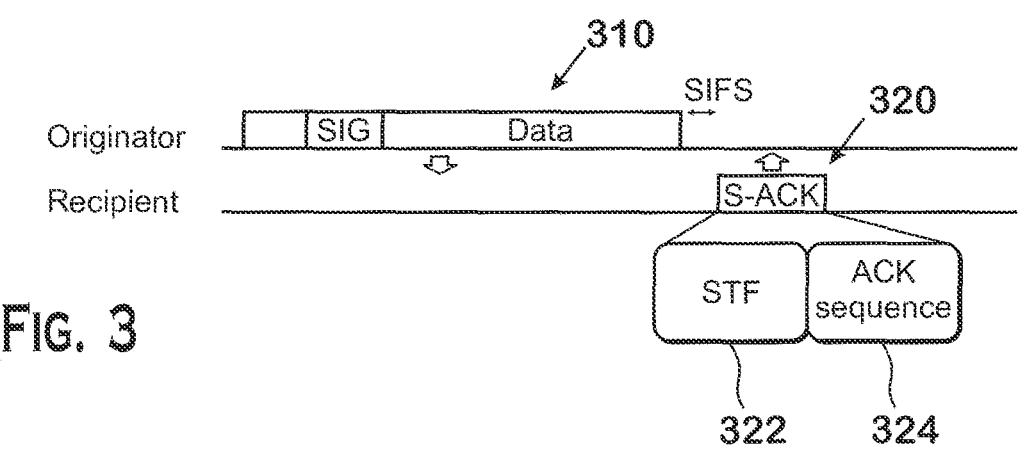
FIG. 3 shows an example message exchange sequence of a data frame and a short ACK frame.

A short ACK frame may be used to acknowledge a data frame (or any other frame) from an originator. FIG. 3 shows an example message exchange sequence of a data frame and a short ACK frame. FIG. 3 also shows an example PPDU frame structure of the short ACK frame in accordance with one embodiment. An originator transmits a data frame 310 to a recipient, and the recipient decodes the data frame 310 and transmits a short ACK frame 320 to the originator to indicate either successful or unsuccessful decoding of the data frame. In the data frame 310, the originator may indicate that the expected ACK transmission will be a short ACK. The originator may explicitly or implicitly identify an ACK sequence ID in the data frame 310. The recipient then includes a corresponding ACK sequence in the ACK sequence field 324 of the short ACK frame 320.

The short ACK frame 320 includes an STF 322 and an ACK sequence field 324. The STF 322 may be utilized for automatic gain control (AGC) and coarse time frequency offset estimation. The short ACK frame 320 may be distinguished from other frames by the STF 322.

The ACK sequence which corresponds to the ACK sequence ID indicated by the data frame 310 indicates the corresponding data frame 310. The ACK sequence may be modulated either in frequency domain or in time domain. For example, a set of pre-defined sequences with the constant amplitude zero auto correlation (CAZAC) property may be used as the ACK sequence. For example, general chirp like (GCL) sequences may be used. The Zadoff-Chu (ZC) sequence is a special case of the GCL sequence. Each sequence has a sequence ID. The originator implicitly or explicitly assigns this sequence ID in the transmitted data frame 310. The recipient includes the corresponding sequence in the short ACK frame 320. The short ACK frame 320 may be utilized for simultaneous multiple user access since orthogonal sequences are chosen.

The originator demodulates a received short ACK frame by correlating with the assigned ACK sequence in either frequency domain or time domain. Once the originator demodulates the short ACK correctly, the originator knows that this is an acknowledgment for the previously transmitted data packet. False detection might be possible. However, the probability of false detection may be reduced by increasing the number of ACK sequences.

Unintended STAs may set their network allocation vector (NAV) when they demodulate the data packet 310 transmitted from the originator. The duration field carried by the data packet 310 may be set considering the fact that the following ACK will be a short ACK. If the unintended STAs fail to demodulate the data packet 310 but detects the short ACK STF field, the unintended STAs identify this is a short ACK frame and may defer accessing the medium accordingly.

The extended inter-frame space (EIFS) may be utilized to defer if a frame is detected but not correctly received. In the current 802.11, EIFS=aSIFSTime+ACKTxTime+DIFS. If the system utilizes a short ACK for all ACK transmissions, or if the STAs know that the short ACK is being utilized, STAs may use a redefined EIFS or a newly defined EIFS_SACK to defer. For example, EIFS_SACK=aSIFSTime+SACKTxTime+DIFS, where SACKTxTime is the time required to transmit an S-ACK frame at the lowest data rate.

The originator may assign the ACK sequence ID for the short ACK frame in the data packet. The ACK sequence ID may be implicitly indicated. For example, the ACK sequence ID may be determined as a function of one or any (full or partial) combination of the following parameters: a scrambler seed (6 bits), FCS (4 bytes), CRC in the SIG field (4 bits), a length field in the SIG field (9-21 bits), and/or a basic service set identity (BSSID) (6 bytes).

Figure 4:
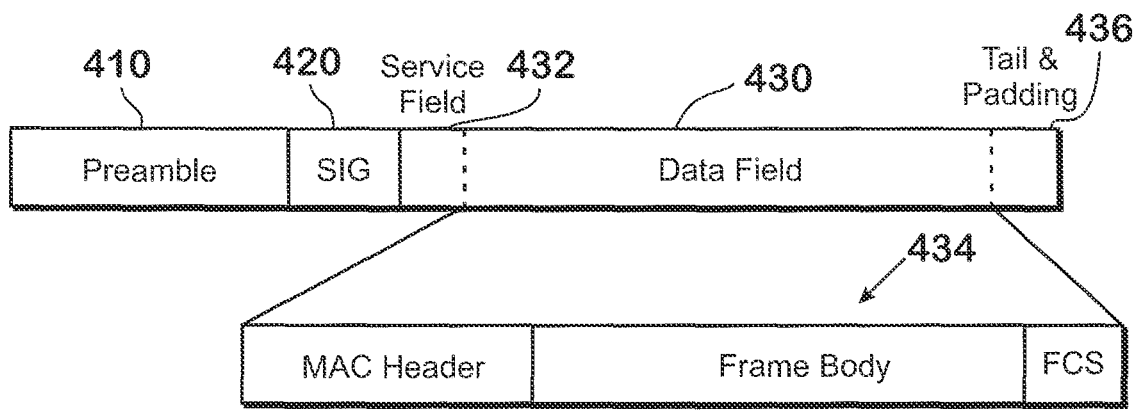
FIG. 4 shows an example physical layer convergence protocol (PLCP) protocol data unit (PPDU) data frame format.

Alternatively, the ACK sequence ID may be explicitly indicated. For example, the ACK sequence ID may be indicated by using a Service filed in the data frame. FIG. 4 shows an example PPDU data frame format. The PPDU 400 includes a preamble 410, a SIG field 420, and a data field 430. The data field 430 includes a service field 432, an MPDU 434, and tail and padding bits 436. The service field 432 is a 16-bit field. The first 7 bits of the service field 432 are the scrambler initialization bits, which are used to synchronize the descrambler and are set to zero normally. The remaining 9 bits of the service field 432 are currently reserved. The reserved 9 bits of the service field 432 may be used to explicitly assign the ACK sequence ID.

The originator may indicate in its data packet that a shortACK frame is expected in response to the data packet. This indication may be provided by using the SIG field 420 (e.g., using 1 bit in the SIG field 420 to indicate that a short ACK frame is expected or acceptable) or the service field 432 (e.g., using 1 bit (e.g., Bit 7) in the service field 432 to indicate that a short ACK frame is expected or acceptable).

In another embodiment, the recipient may respond to the data frame with a short ACK frame and a short ACK indication may be included either explicitly or implicitly in the short ACK frame. The AP and STAs (intended and unintended) may identify the frame as a short ACK frame based on the short ACK indication. Due to the simple structure of the short ACK frame, receiving STAs may determine that it is a short ACK frame before starting the correlation detection of the ACK sequence.

Figure 5:
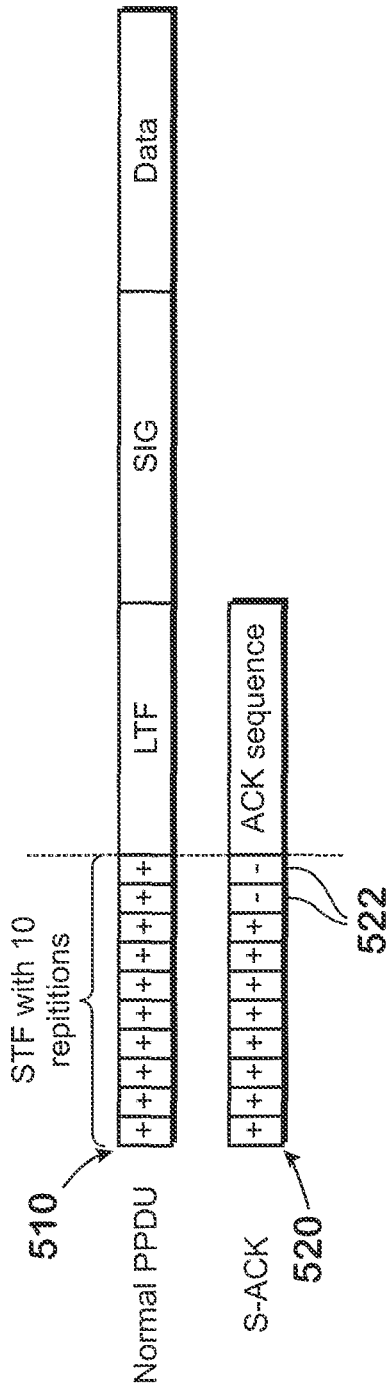
FIG. 5 shows a normal PPDU and an example short ACK frame with a short ACK indication.

The short ACK indication may be included in the STF field. The STF includes several repetitions of a sequence. For example, most of the 802.11 systems contain 10 repetitions of the STF sequence, while the 802.11ah STF for 1 MHz has 20 repetitions. In one embodiment, the sign of one or more repetition of the STF sequence may be flipped to indicate that the frame is a short ACK frame. FIG. 5 shows a normal PPDU 510 and an example short ACK frame 520 with a short ACK indication. In FIG. 5, the sign of the last two STF sequences 522 is flipped to indicate that the frame is a short ACK frame. This will change the autocorrelation behavior, so that the receiver may detect that this is a short ACK frame.

Figure 6:
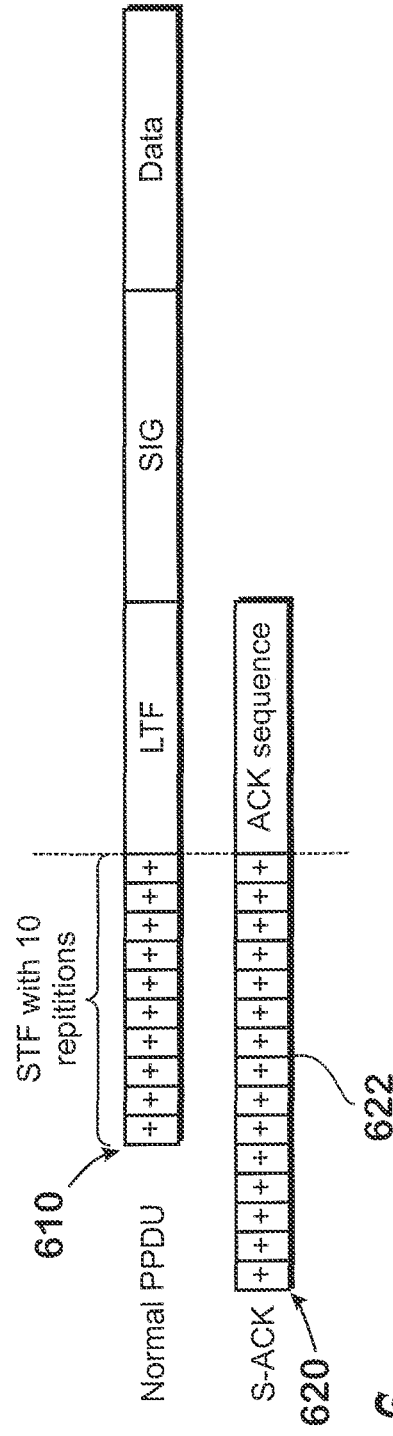
FIG. 6 shows a normal PPDU and an example short ACK frame with an extended short training field (STF)

In another embodiment, an extended number of repetitions of the STF sequence may be used to indicate a short ACK frame. FIG. 6 shows a normal PPDU 610 and an example short ACK frame 620 with an extended STF 622. Once the receiver detects a longer than normal STF or autocorrelation platform, it may determine that the frame is a short ACK frame.

An ACK frame is modulated and coded in the physical layer before transmission. The modulation and coding scheme (MCS) may be the highest rate in the BSSBasicRateSet parameter that is less than or equal to the rate (MCS) of the previously received data frame. In this way, the STAs in the BSS have the capability to detect the ACK frames.

In order to reduce the overhead from ACK, a higher MCS may be more promising since it may require less number of OFDM symbols to transmit. In some 802.11 standards, an ACK indication field is defined in the SIG field and transmitted by the originator. ACK indication is used to indicate the information about the following ACK frame. For example, in 802.11ah, ACK indication has the following definitions (00: ACK; 01: BA; 10: No ACK; 11: a frame that is not ACK, BA or CTS). With ACK indication, unintended STAs may figure out whether the following frame is an ACK frame. Thus, it is not necessary that the STAs have to understand the ACK frame body. In one embodiment, the requirement of choosing an MCS for an ACK frame in the BSSBasicRateSet may be relaxed when an ACK indication is employed in the SIG field. Without ACK indication transmitted in the SIG field from the originator, the unintended STAs have to decode the ACK frame to figure out that this is an ACK frame. Thus, the ACK frame should use a basic MCS which can be understood by all the STAs. It has to be an MCS defined in BSSBasicRateSet. With ACK indication in the SIG field from the originator, the unintended STAs may detect the SIG field and notice that an ACK frame is coming, and defer for a certain duration. In this way, the other STAs do not need to decode the ACK frame at all, so the ACK frame may use any MCS other than that defined in BSSBasicRateSet.

In another embodiment, the originator may assign an MCS and/or bandwidth for the ACK frame, and the recipient may transmit an ACK frame with a pre-assigned MCS and/or bandwidth.

In 802.11ah, receivers should support both 1 MHz and 2 MHz reception, while 1 MHz is required to be supported at the transmitter side. Therefore, it is possible that an AP transmits a 2 MHz packet to a STA and indicates explicitly or implicitly in the data packet that the following ACK will be transmitted with 1 MHz. Alternatively, a STA may transmits a 1 MHz packet to the AP and the AP, which is operating on a 2 MHz channel, has a choice to reply with either 1 MHz or 2 MHz ACK. Transmitting the ACK with 2 MHz may reduce the ACK overhead. In the above example, the STA may indicate the bandwidth utilized by the AP for ACK transmission.

In another example, a STA may have two receive radio frequency (RF) chains but one transmit RF chain. Once the STA transmits one data stream packet to an AP, with current standards, the AP may transmit ACK with one data stream. However, if the channel condition is very good, allowing the AP to transmit the ACK with two data streams may be more efficient. In one embodiment, the STA may check the channel condition when it receives the previous two data stream packet from the AP, and determine if it is suitable for the AP to transmit the ACK with two data streams.

When an originator transmits a data packet to a recipient, if the originator has some knowledge of the channel from the recipient to the originator and is aware of the asymmetrical transmit and receive capabilities, the originator may determine a specific MCS and/or bandwidth for the ACK frame and indicate it in the data frame. Otherwise, the originator may choose an MCS equal to or lower than the MCS used in the previous data packet and choose bandwidth according to the capabilities of the originator and the recipient.

Figure 7:
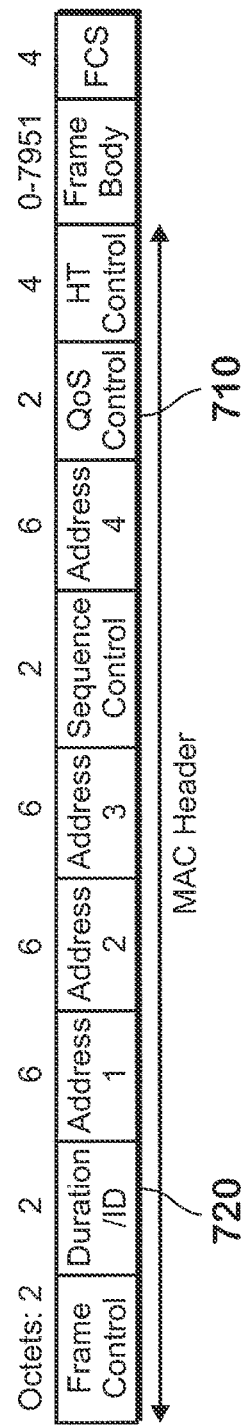
FIG. 7 shows a conventional medium access control (MAC) frame format.

The selected MCS and bandwidth for the following ACK frame may be indicated in the MAC header of the data packet. FIG. 7 shows a conventional MAC frame format. In the current 802.11 standards, an ACK policy subfield is defined in a QoS control field 710 of the MAC header. The ACK policy subfield is 2 bits in length and identifies the acknowledgment policy that is followed upon delivery of the MPDU. In one embodiment, the ACK policy subfield may be extended for MCS and bandwidth indication. The number of bits needed for MCS and bandwidth information may vary depending on the standards. For example, with 802.11ah, 2 bits may be used to indicate the bandwidth as shown in Table 1.

TABLE 1

| [B0, B1] | Meaning |
|---|---|
| 00 | 1 MHz |
| 01 | 2 MHz |
| 10 | Same bandwidth as previous packet |
| 11 | Reserved |

Alternatively, the MCS and bandwidth for the ACK frame may be explicitly indicated in the SIG field. For example, several bits may be added in the SIG field to represent the MCS and bandwidth for the ACK frame.

Alternatively, the MCS and bandwidth for the ACK frame may be implicitly indicated by setting a Duration field 720 in the MAC header. A Duration field 720 in the MAC header may be set to the time value required to transmit the pending packet plus one ACK or block ACK plus short inter-frame space (SIFS) interval. The duration value of the ACK or block ACK may be calculated with the pre-assigned MCS and bandwidth.

When an ACK frame is transmitted with a pre-assigned MCS and bandwidth, the NAV setting may be modified accordingly. The Duration field 720 of the MAC frame transmitted by the originator holds a time value which indicates the duration the originator expects the medium to be busy. Conventionally, the originator does not assign an MCS to the following ACK frame. Therefore, the originator estimates the duration of the following ACK transmission based on the lowest MCS supported by the system. With the pre-assigned MCS in accordance with the embodiments disclosed herein, the originator may estimate the following ACK transmission with the assigned MCS, and give a more accurate time value in the Duration field 720. In this way, unintended STAs may set the NAV more accurately.

Once the recipient correctly demodulates the data packet, it prepares an ACK packet accordingly. When explicit indication is utilized, the recipient may transmit the ACK frame with the pre-assigned MCS and bandwidth. When implicit indication is utilized, the recipient may transmit the ACK frame with an MCS and bandwidth which may complete the ACK transmission within the specified duration. The MCS and bandwidth utilized by the recipient may not be required to be identical to that chosen by the originator. However, the ACK PPDU duration may need to fit into the duration value set by the originator in the MAC header.

The ACKs or BAs for a plurality of users (e.g., STAs) may be transmitted via a single ACK or BA transmission. The ACKs (or BAs) for a plurality of users may be aggregated in a spatial domain and transmitted using multi-user multiple-input multiple-output (MU-MIMO) or aggregated in a time domain and transmitted using an aggregated multi-user ACK.

Figure 8:
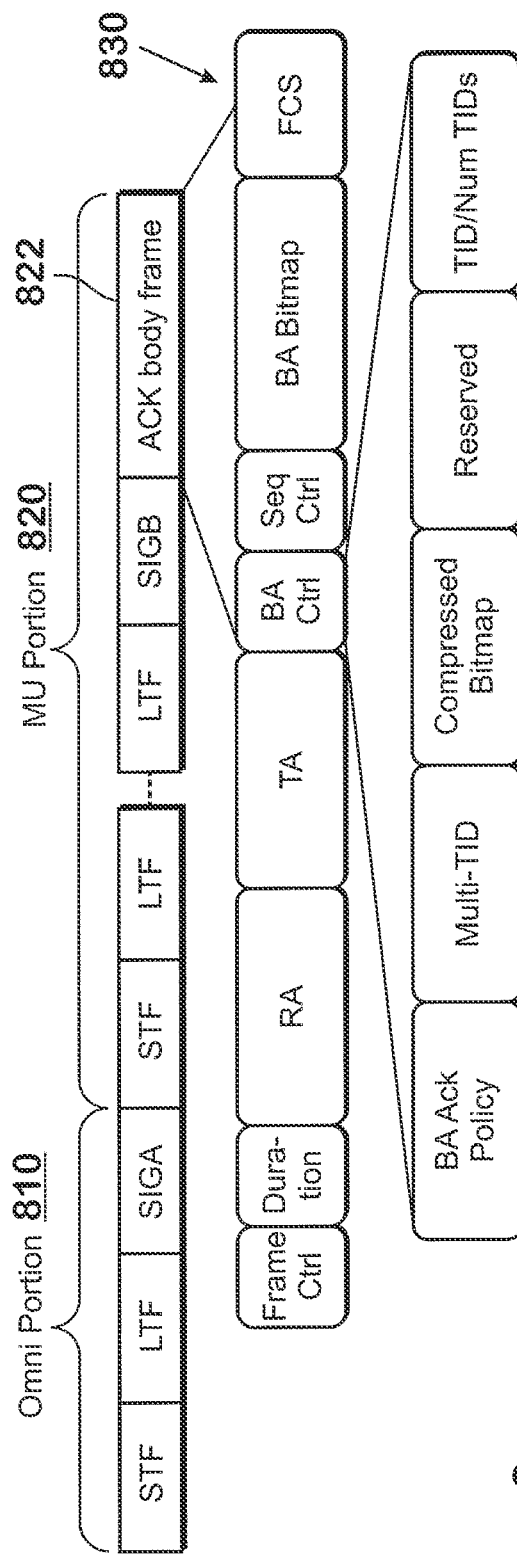
FIG. 8 shows an example of PPDU frame structure for a MU-MIMO block ACK.

In one embodiment, the MU-MIMO PPDU format may be used to transmit a delayed multi-user ACKs or block ACKs. FIG. 8 shows an example of PPDU frame structure for a MU-MIMO block ACK. The PPDU includes an omni portion 810 and a MU portion 820. The omni portion 810 is transmitted for all users and the MU portion 820 is transmitted via each spatial stream of the MU-MIMO transmission. The omni portion 810 includes an STF, an LTS and a SIG field (SIGA). The MU portion 820 includes an STF, LTFs, and an ACK body frame 822. The ACK body frame 822 shown in FIG. 8 is a BA frame 830. Alternatively, the ACK body frame 822 may be a normal ACK frame. The multi-user block ACK may be applied to a delayed multi-user block ACK.

Figure 9:
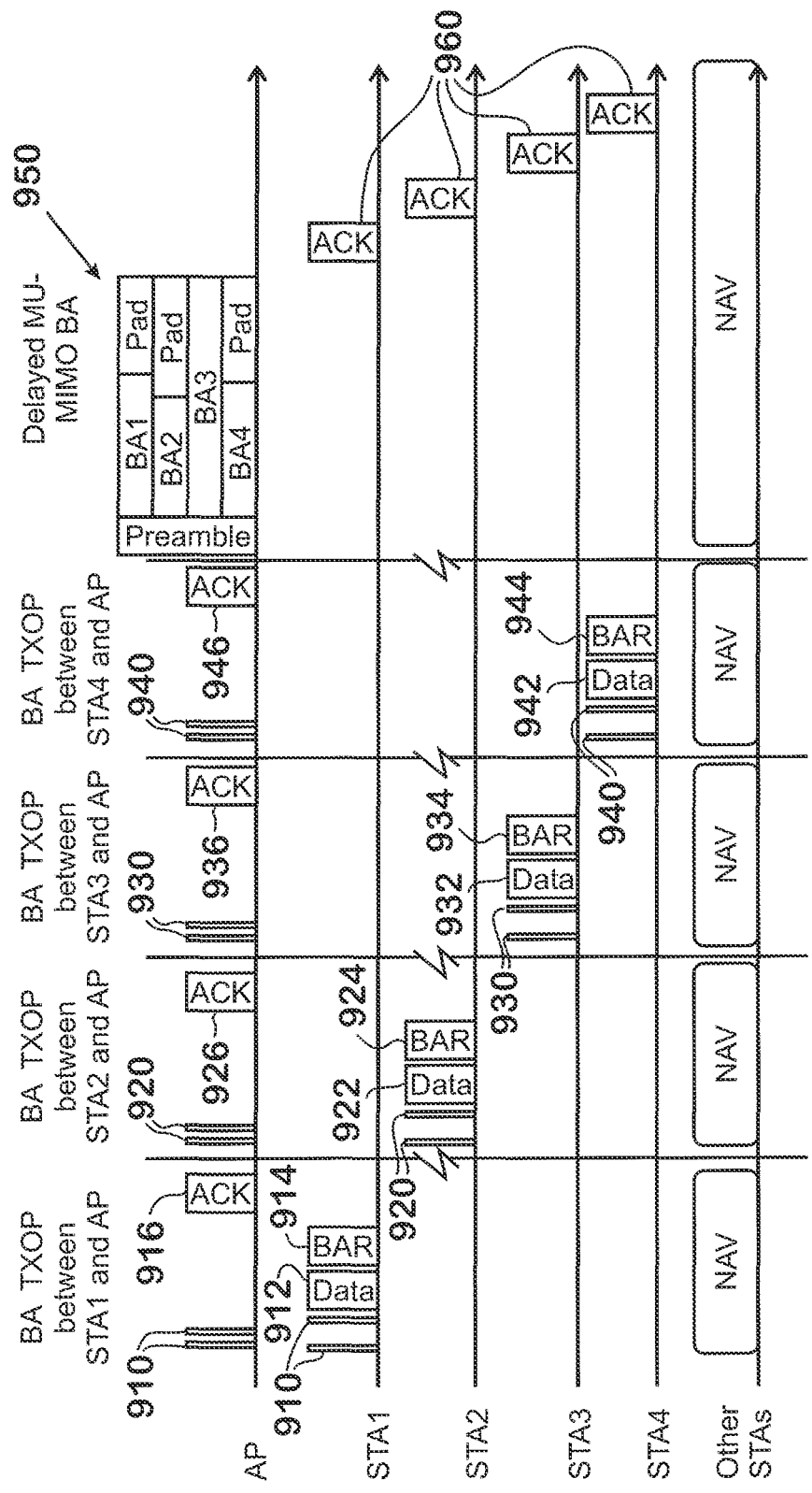
FIG. 9 shows an example message exchange sequence for delayed MU-MIMO block ACK.
Figures 10, 11:
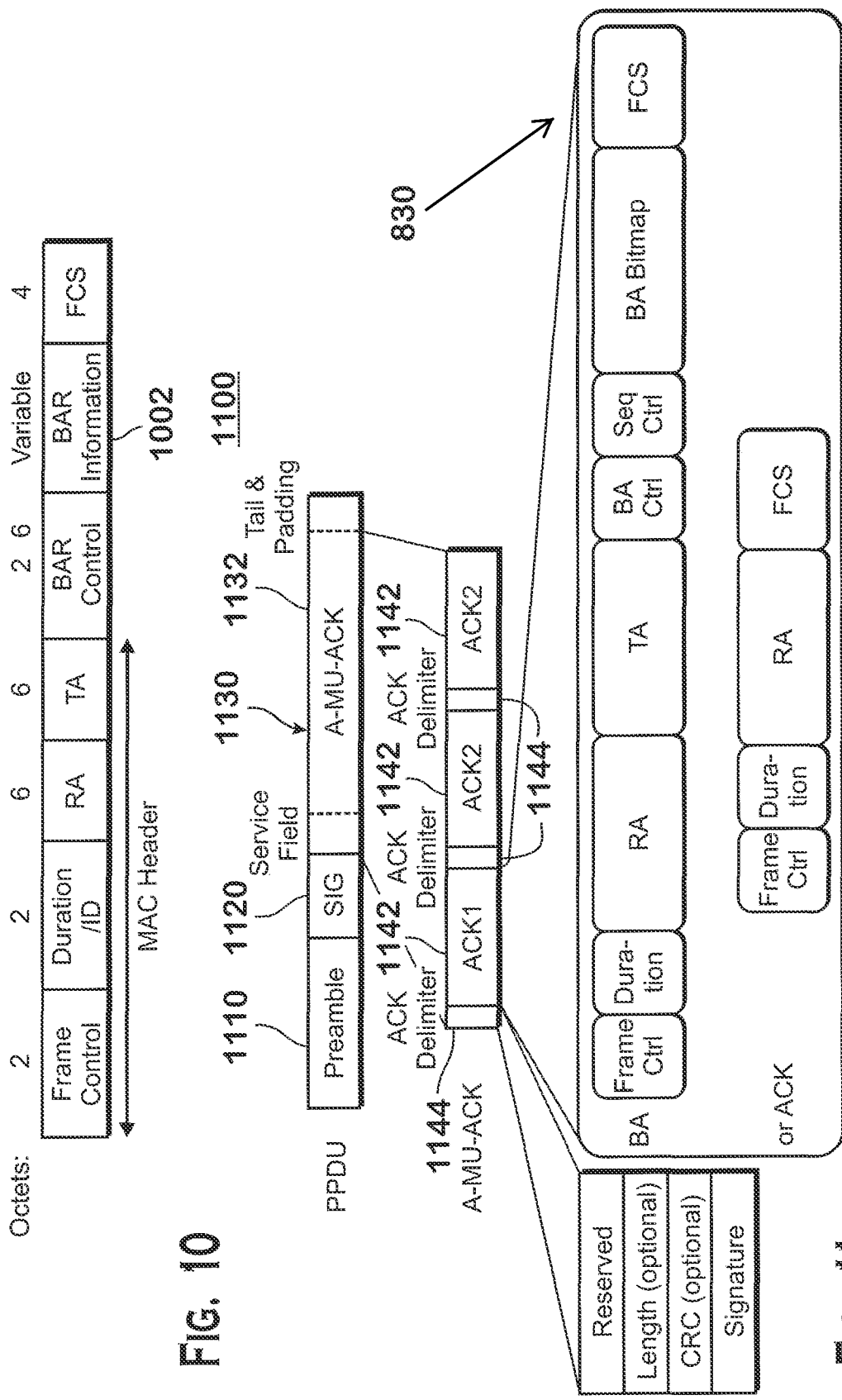
FIG. 10 shows a block ACK request (BAR) frame format.
FIG. 11 shows an example PPDU structure for an aggregated multi-user ACK (A-MU-ACK) frame.

FIG. 9 shows an example message exchange sequence for delayed MU-MIMO block ACK. STA1 acquires a channel and negotiates with an AP with a few message exchanges 910 to set up a block ACK session with the AP with delayed block ACK policy. An originator (STA1 in this example) transmits data, followed by a block ACK request (BAR) 914. The BAR frame 914 solicits an ACK frame 916 from the recipient (AP in this example). FIG. 10 shows a BAR frame format. The BAR frame 914 includes a BAR control field 1002. If a BAR ACK policy field in the BAR control field 1002 is set to '1', the recipient returns an ACK immediately upon receipt of the BAR frame 914. If a BAR ACK policy field in the BAR control field 1002 is set to '0', the recipient does not send an ACK upon receipt of the BAR frame 914. In the example shown in FIG. 9, the AP sends an ACK 916 in response to the BAR frame 914. During each BA session, unintended STAs (all STAs other than the originator (STA2-STA4 in this example) and the recipient (AP in this example)) may set their NAV during the BA session. The AP will hold the BA for STA1, and wait for delayed transmission.

STA2 then acquires a channel and exchanges messages 920 to set up a BA session with the AP and transmits data frames 922 and a BAR frame 924 to the AP, and receive an ACK frame 926 from the AP. STA3 then acquires a channel and exchanges messages 930 to set up a BA session with the AP and transmits data frames 932 and a BAR frame 934 to the AP, and receive an ACK frame 936 from the AP. STA4 then acquires a channel and exchanges messages 940 to set up a BA session with the AP and transmits data frames 942 and a BAR frame 944 to the AP, and receive an ACK frame 946 from the AP.

The AP may group several block ACKs (BA1-BA4 in this example) and transmit them using a MU-MIMO transmission, (i.e., delayed MU-MIMO BA). The AP may group multiple block ACKs according to some grouping criteria, (e.g., with similar access category (AC), or good spatial channel correlation), for MU-MIMO block ACK transmission.

The AP may modulate the BAs with different MU-MIMO weights, and transmits them simultaneously. Within the MU-MIMO BA frame, the BA ACK policy field in the BA control field indicates whether an ACK is requested in response to the BA frame. The BA ACK policy field may be set to '0' or '1' for all users. If the BA ACK policy field is set to '1', the BA frame 950 will not solicit an ACK response from the originator (STA1-STA4 in this example). If the BA ACK policy field is set to '0', the BA frame 950 solicits an ACK response 960 from the originators (STA1-STA4 in this example) as shown in FIG. 9.

The ACK responses 960 from the STAs in response to the MU-MIMO BA 950 may be transmitted by the STAs simultaneously using MU-MIMO. Alternatively, the STAs may transmit an ACK sequentially, for example, according to the user position array defined in a group ID. The group ID may be included in the SIG field.

All AP/STAs involved in the delayed MU-MIMO ACK sequence may declare the support of delayed block ACK and MU-MIMO.

In another embodiment, instead of transmitting ACKs or BAs for multiple users with MU-MIMO, the ACKs or BAs may be aggregated in time domain and transmitted sequentially, (i.e., an aggregated multi-user ACK (A-MU-ACK)). A receiver (STA or AP) receives data packets, and generates acknowledgement packets in response to received data packets, and may aggregate the acknowledgement packets and transmit the aggregated acknowledgement packets in the single transmission.

FIG. 11 shows an example PPDU structure for an A-MU-ACK frame. In FIG. 11, the ACKs are aggregated at the MPDU level. The aggregated ACKs may be block ACKs or normal ACKs. The PPDU for the A-MU-ACK 1100 includes a preamble 1110, an SIG field 1120, and a data field 1130. Within the data field 1130, the A-MU-ACK frame 1132 is included. The A-MU-ACK frame 1132 includes ACK (or BA) MPDUs 1142 for one or more users (ACK1, ACK2, ACK3 in this example) separated by ACK delimiters 1144. The ACK/BA MPDUs 1142 are aggregated at a MAC level and the A-MU-ACK frame 1132 is passed to the physical layer as an aggregated MPDU packet so that the A-MU-ACK frame 1132 may be coded and modulated by the physical layer as a whole packet. The lowest MCS may be used for the A-MU-ACK.

An ACK delimiter 1144 may be inserted at the beginning of each ACK/BA MPDUs 1142. The ACK delimiter 1144 may be 32 bits or 8 bits in length. A 32-bit ACK delimiter may include a length field, a CRC and an 8-bit signature field. The length field may be used to indicate the length of the following ACK/BA MPDU. The signature field may be used to detect an ACK delimiter when scanning for a delimiter. An 8-bit ACK delimiter may include an 8-bit signature field, which is used to detect an ACK delimiter when scanning for a delimiter.

The aggregated multi-user ACK packet may be broadcast or multicast to more than one user (e.g., STA). Since different users may have different radio link quality due to path-loss, channel condition, receiver sensitivity, etc., using the same MCS for all users in the same aggregated multi-user ACK packet may be simple but may not be efficient. In addition, if a relatively lower MCS is chosen, all the users may not decode the aggregated multi-user ACK frame correctly.

Figure 12:
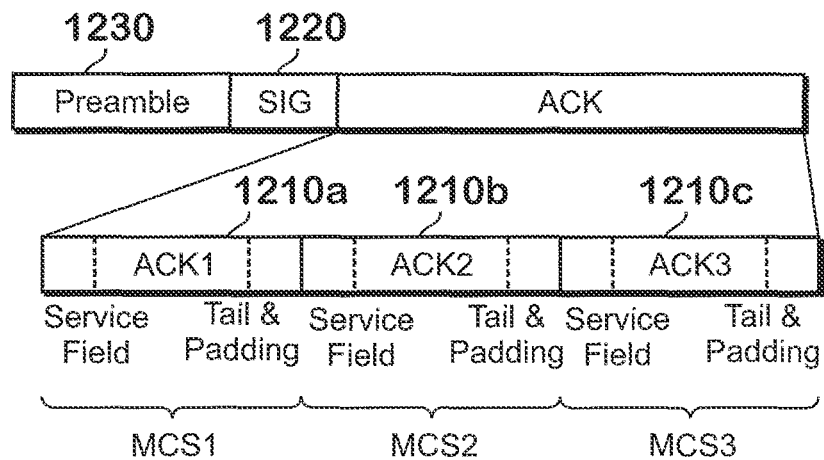
FIGS. 12 and 13 show examples of the ACK or block ACK (BA) MAC protocol data units (MPDUs) aggregated into the multi-user ACK frame coded with a separate modulation and coding scheme (MCS)
Figure 13:
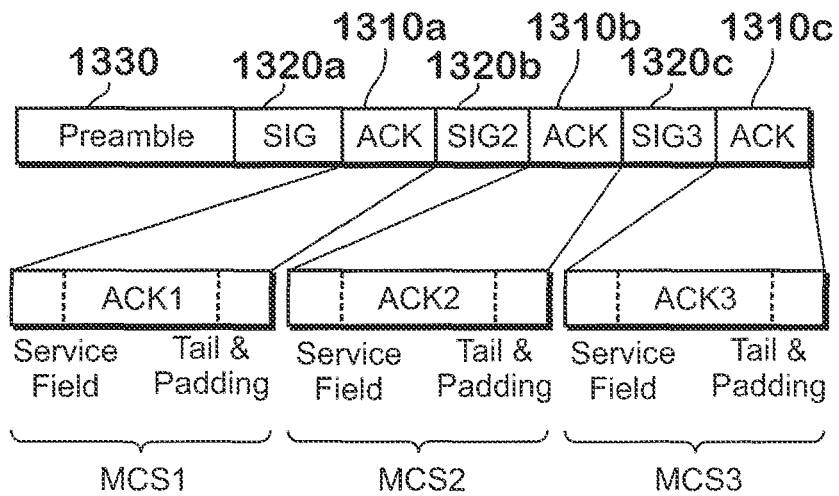

The ACK or BA MPDUs aggregated into the multi-user ACK frame may be coded with a separate MCS, as shown in FIGS. 12 and 13. In the examples shown in FIGS. 12 and 13, three ACK/BA MPDUs included in an aggregated multi-user ACK frame are separately encoded with three MCSs (that may or may not be the same). The length and MCS for each MPDU may be indicated in the SIG field. In FIG. 12 the aggregated multi-user ACK frame includes a common SIG field 1220 for three ACK MPDUs 1210*a*-1210*c*. In FIG. 13, a separate SIG field 1320*a*-1320*c* is included for each ACK/BA MPDU 1310*a*-1310*c*.

Multi-user aggregation may be performed after constellation mapping and before inverse discrete Fourier transform (IDFT). In this way, for all of the coded ACK frames other than the last frame, one padding and tail bit field may be added. There is no need to insert more padding bits to round up to an integer number of OFDM symbols. For the last coded ACK frame, both tail and padding bits may be inserted if necessary. The length field in the SIG field may indicate explicitly the length of each ACK body frame in bytes with this scheme.

Alternatively, multi-user aggregation may be performed after IDFT, (i.e., the aggregation is in the unit of OFDM symbols). Each coded ACK frame may occupy an integral number of OFDM symbols. Therefore, the tails bits and the OFDM symbol padding bits may be added for each coded ACK frame. The length field in the SIG field may indicate the length of each ACK body frame in the unit of bytes or OFDM symbols.

FIG. 12 shows an example of aggregated multi-user ACK with a common SIG field 1220. FIG. 13 shows an example of aggregated multi-user ACK with separate SIG fields 1320. In both FIGS. 12 and 13, each ACK/BA MPDU may be encoded with a separate MCS.

In the examples shown in FIGS. 12 and 13, all the users may use the common preamble 1230, 1330 for channel estimation. Therefore, the use of MIMO schemes may be limited. For example, if space time block coding (STBC) scheme is utilized, the STBC may be utilized for all users in the packet and different MIMO schemes may not be used for some of the users.

Figure 14:
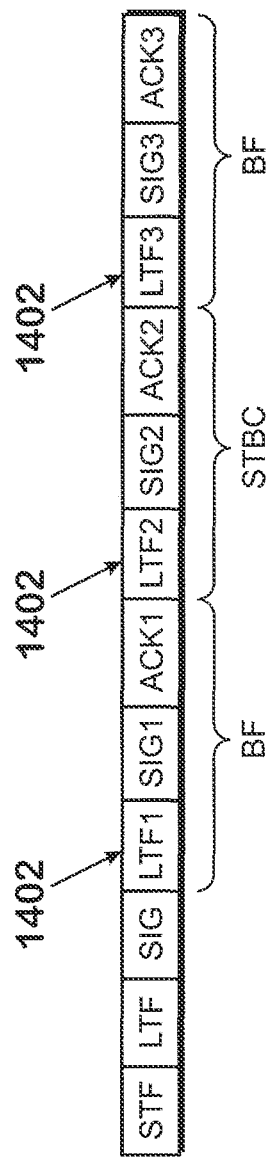
FIG. 14 shows an example of aggregated multi-user ACK with a separate long training field (LTF) for each user for implementing various MIMO schemes for the users.

In another embodiment, various MIMO schemes may be utilized in transmission of the aggregated multi-user ACK frame, for example, using the PPDU structure shown in FIG. 14. FIG. 14 shows an example of aggregated multi-user ACK with a separate LTF for each user for implementing various MIMO schemes for the users. In FIG. 14, a dedicated LTF 1402, (LTF1, LTF2, LTF3 in this example) is included for each user for AGC adjustment and channel estimation. The length of the dedicated LTF for each user may depend on the number of data streams transmitted and whether AGC is needed. With separate LTFs, different MIMO schemes may be used for different users (in this example, beamforming for user 1 and user 3, and STBC for user 2).

In another embodiment, a hierarchical modulation may be used to simultaneously transmit ACKs for different users within different constellations of the same OFDM symbol (s). Hierarchical modulation can multiplex multiple data streams, (e.g., for different users), into one single symbol stream, where base-layer symbols and enhancement-layer symbols are synchronously overplayed before transmission.

The acknowledgement may be piggybacked in a data packet, (i.e., piggyback ACK). With a piggyback ACK, a data frame is overloaded with an acknowledgment of a previously received MAC protocol data unit (MPDU) and/or a poll to the STA to which the frame is directed. A piggybacked ACK is used to reduce the overhead required for feedback of acknowledgements.

Figure 15:
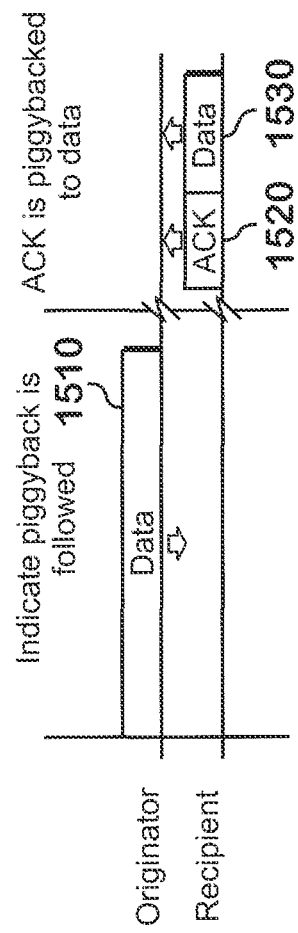
FIG. 15 shows an example of single user piggyback ACK.

The ACK and the data to which the ACK is piggybacked may be directed to a single user, (i.e., single user piggyback ACK). FIG. 15 shows an example of single user piggyback ACK. An originator transmits a data packet 1510 to a recipient. If the data is not time sensitive, a piggyback ACK may be used. The originator may indicate (e.g., in the data packet) that a piggyback ACK is allowed. If the recipient has data payload 1530 directed to the originator, the recipient may piggyback the ACK 1520 with the data packet 1530. The piggyback ACK may be immediate or delayed. If the recipient has no data payload to the originator, the recipient may delay the ACK, (i.e., piggyback the ACK with data later).

Figure 16:
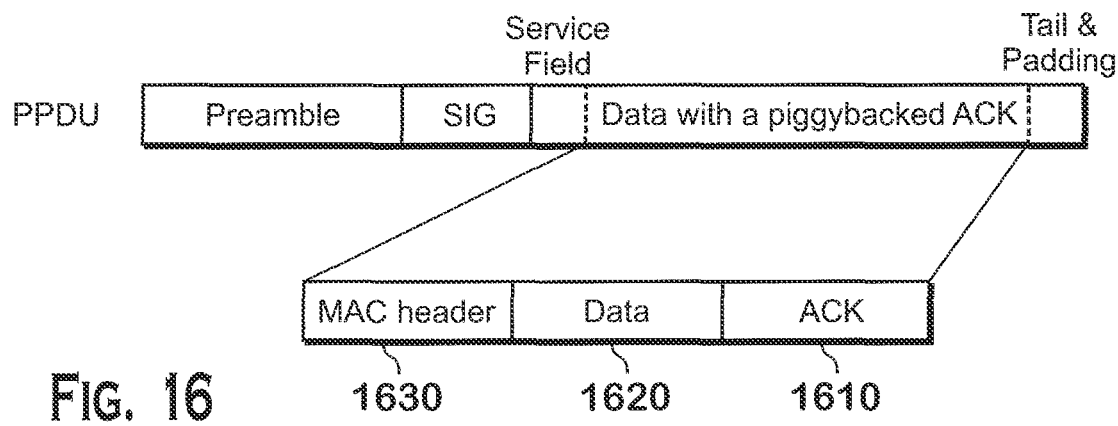
FIG. 16 shows an example of single user piggyback ACK aggregated in an MSDU level.

The single user piggyback ACK may be performed in an MSDU level. FIG. 16 shows an example of single user piggyback ACK aggregated in an MSDU level. An ACK (or BA) MSDU 1610 and a data MSDU 1620 are aggregated, and a modified MAC header 1630 may be added to the aggregated ACK and data MSDUs. The MAC header 1630 may indicate that the subtype of the frame is a data frame with a piggybacked ACK or BA. Once the subtype field in the frame control field in the MAC header indicates the frame is a data frame with a piggybacked ACK or BA, the sequence control field in the MAC header may be extended to cover the sequence number of the data MSDU and ACK. If a BA is utilized, the BA control field may be included in the MAC header.

Figure 17:
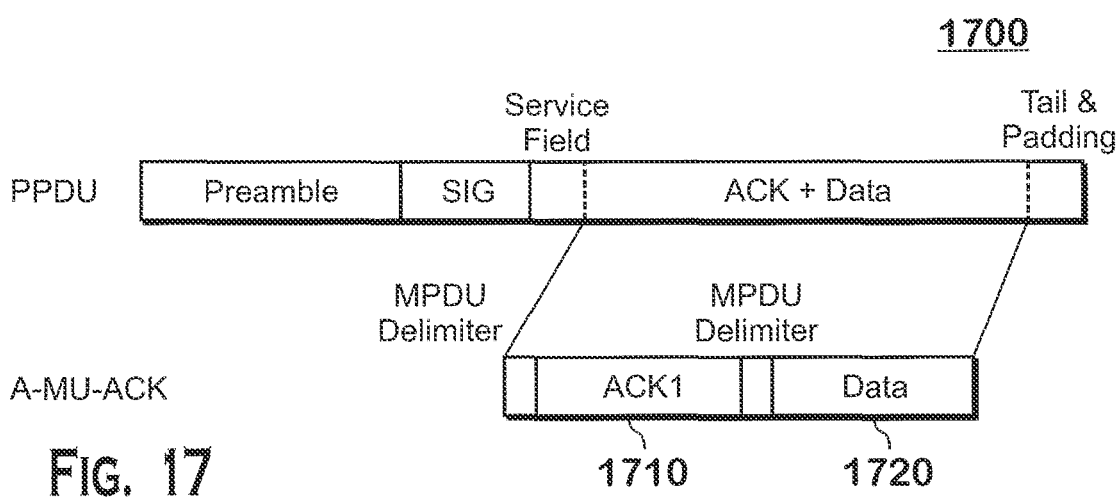
FIG. 17 shows an example of piggyback ACK in an MPDU level.

Single user piggyback ACK may be performed in the MPDU level. FIG. 17 shows an example of piggyback ACK in an MPDU level. An ACK MPDU 1710 and a data MPDU 1720 are aggregated, and passed to the physical layer. A common PLCP header and preamble are added to the aggregated packet to form a PPDU 1700. In this scheme, an ACK MPDU 1710 and a data MPDU 1720 may be coded and modulated with the same MCS. The ACK and data are included into separate MPDUs with a separate MAC header and the MPDUs are separated by MPDU delimiters.

Figure 18:
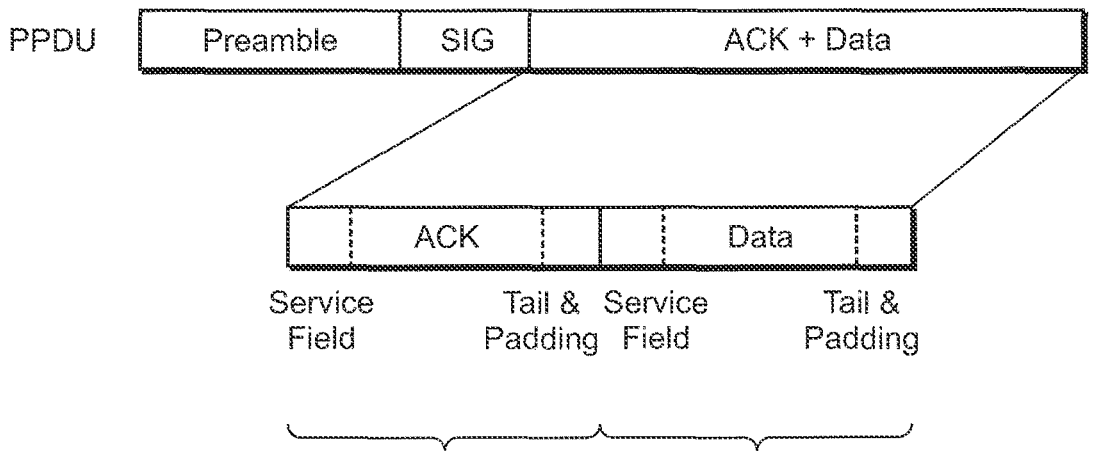
FIG. 18 shows an example of piggyback ACK in a PPDU level.

Single user piggyback ACK may be performed in the PPDU level. FIG. 18 shows an example of piggyback ACK in a PPDU level. ACK and data are included in separate MPDUs, and the MPDUs are modulated and coded separately. A separate MCS may be used for the MPDUs. As shown in FIG. 18, a common SIG field may be utilized in which MCS for ACK and data are defined. Alternatively, separate SIG fields may be included.

The single user piggyback packet may include more than one data packet and/or more than one ACK/BA packet.

Figures 19, 20:
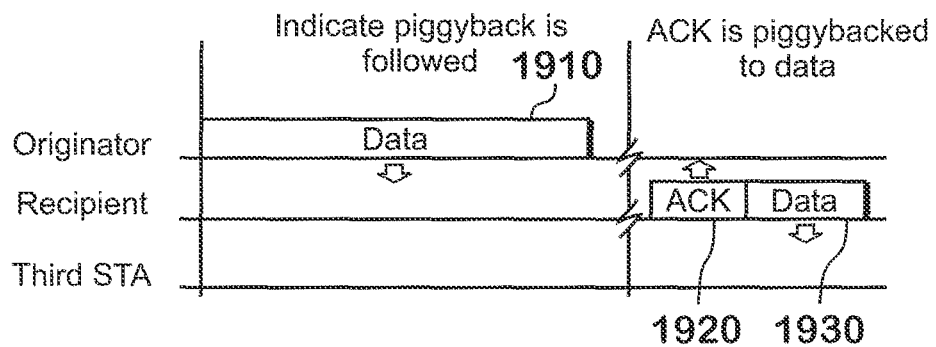
FIG. 19 shows an example of multi user piggyback ACK.
FIG. 20 shows a conventional ADDBA Request frame action field format.

The ACK and data may be directed to different users, (i.e., multi-user piggyback ACK). The piggyback ACK may be immediate or delayed. FIG. 19 shows an example of multi user piggyback ACK. An originator transmits a data packet 1910 to a recipient. If the data is not time sensitive, the originator may allow a piggyback ACK. In this case, the originator may indicate (e.g., in the data packet) that a piggyback ACK is allowed. The recipient may choose to piggyback the ACK 1920 with a data packet 1930 directed to a third STA.

Multi user piggyback ACK may be performed in an MPDU level. In this case, ACK and data MPDUs are aggregated, and passed to a physical layer. A MAC header of each MPDU packet has its own receiver address (RA) information. A common PLCP header and preamble are added to the aggregated packet to form a PPDU. In this scheme, ACK and data MPDUs may be coded and modulated with the same MCS. Similar to the single user piggyback ACK, multi user piggyback in the MPDU domain may utilize the frame format shown in FIG. 17.

Multi user piggyback ACK may be performed in a PPDU domain. In this case, ACK and data are in separate MPDUs, and may be modulated and coded separately. A common SIG may be used in which an MCS for ACK and data are defined. Alternatively, separate SIGs may be used.

Multi user piggyback ACK packets may include more than one data packet and/or more than one ACK or BA packet.

Embodiments for delayed multi-user ACK (DMA) setting up are explained hereafter. DMA may be an efficient ACK mechanism that can effectively reduce the overhead for data packets by acknowledging packets from multiple users simultaneously.

A STA may indicate to an AP during association or any other time that the STA is capable of receiving delayed multi-user ACKs. In order to facilitate the delayed multi-user ACKs, three new action frames, Add Delayed Multi-user ACK Request Action frame (ADDDMA Request), Add Delayed Multi-user ACK Response Action frame (ADDDMA Response), and Delete Delayed Multi-user ACK frame (DELDMA) may be defined.

The ADDDMA frame is used to set up or to modify delayed multi-user ACK for a specific traffic class (TC) or traffic stream (TS). The ADDDMA Response frame is sent in response to an ADDDMA Request frame. The DELDMA frame is sent by either the originator or the recipient to terminate the delayed multi-user ACK participation.

The three new action frames may, for example, be implemented using the conventional block ACK action frame. Example block ACK action field values for the ADDDMA Request, ADDDMA Response, and DELDMA frames are shown in Table 2.

TABLE 2

| Block ACK Action field value | Meaning |
| --- | --- |
| 3 | ADDDMA Request |
| 4 | ADDDMA Response |
| 5 | DELDMA |
| 6 | DMA Request |
| 7 | DMA |
| 8-255 | Reserved |

An ADDBA Request frame may be used as a format of the ADDDMA Request frame. FIG. 20 shows a conventional ADDBA Request frame action field format. The Block ACK action field 2002 may be set to '3' to indicate that this is an ADDDMA Request frame. The Block Ack Policy bit in the Block Ack Parameter Set 2004 may be interpreted as, if set to "0", regular delayed multi-user ACK for the STA, not for a specific traffic class (TC) or traffic stream (TS), and, if set to "1", delayed multi-user ACK for the STA for a specific TC or TS specified by the traffic identifier (TID) field in the Block Ack Parameter Set 2004. Several bits in the Block Ack Timeout Value field 2006 or in other fields may be used to indicate the delayed multi-user ACK options: scheduled delayed multi-user ACK, unsolicited delayed multi-user ACK, or solicited delayed multi-user ACK.

An ADDBA Response frame may be used as a format of the ADDDMA Response frame. FIG. 21 shows a conventional ADDBA Response frame action field format. The Block Ack Action field 2102 may be set to '4' to indicate that this is an ADDDMA Response frame. The Block Ack Policy bit in the Block Ack Parameter Set 2104 may be interpreted as, if set to "0", regular delayed multi-user ACK for the STA, not for a specific TC or TS, and if set to "1", delayed multi-user ACK for the STA for a specific TC or TS specified by the TID field in the Block Ack Parameter Set 2104. Several bits in the Block Ack Timeout Value field 2106 or in other fields may be used to indicate the delayed multi-user ACK options: scheduled delayed multi-user ACK, unsolicited delayed multi-user ACK, or solicited delayed multi-user ACK.

A DELBA frame may be used as a format of the DELDMA frame. FIG. 22 shows a conventional DELBA frame. The Block Ack Action field 2202 may be set to '5' to indicate that this is a DELDMA frame. One of the reserved bits of the DELBA Parameter Set field 2204 (bit 0-10) may be interpreted as, if set to "0", delete the delayed multi-user ACK for the STA, not for a specific TC or TS, and if set to "1", delete the delayed multi-user ACK for the STA for a specific TC or TS specified by the TID field in the DELBA Parameter Set 2204.

A STA may indicate to a receiving STA or AP, that it is capable of and willing to use the delayed multi-user ACK mechanism by sending an ADDDMA Request frame to the receiving STA/AP. The STA may indicate to a receiving STA/AP that it is initiating the delayed multi-user ACK for just one TS or TC originated from itself by sending an ADDDMA Request frame and set the Block Ack Policy bit to "1" and the TID field to the TID of the TS or TC.

The receiving STA/AP may respond by sending an ADDDMA Response frame. The receiving STA/AP, after receiving the packets from the STA and other STAs with which it has set up a delayed multi-user ACK may record the packets received. The receiving STA/AP may later send a delayed multi-user ACK frame at a pre-set time in case of scheduled delayed multi-user ACK or unsolicited delayed multi-user ACK or at the request of one of more STAs in case of solicited delayed multi-user ACK.

The transmitting and receiving STAs or AP may delete the delayed multi-user ACK arrangement by transmitting a DELDMA frame, which may be immediately acknowledged by the other party in the delayed multi-user ACK.

After a STA transmits its packet, the packet may not be immediately acknowledged by the receiving STA/AP, since the receiving STA/AP may accumulate packets from more STAs and then acknowledge them simultaneously using a delayed multi-user ACK frame.

Since STAs may be battery powered, it may be desirable to have STAs transmit their packets, go to a doze state, and wake up at a pre-determined time to receive a delayed multi-user ACK frame from the recipient (e.g., AP). In case of scheduled delayed multi-user ACK, the originator (e.g., STA), which has already set up DMA arrangement with the recipient, may go to a doze state immediately after their own transmission, and may wake up at the delayed multi-user ACK transmission interval following their own transmissions to receive a delayed multi-user ACK frame from the recipient. The recipient may indicate the delayed multi-user ACK transmission intervals in a beacon, or a short beacon or other types of management, control, or action frame.

If the originator discovers that its packets are not received by the recipient successfully by evaluating the delayed multi-user ACK frame, the originator may immediately retransmit the packets that are not positively acknowledged or may retransmit at a later point of time.

In case of unsolicited delayed multi-user ACK, the recipient, (e.g., AP), may decide that it has received enough number of packets from originators (e.g., STAs) that have already set up DMA arrangement with the recipient, and may transmit a delayed multi-user ACK frame to acknowledge all packets received.

In case of solicited delayed multi-user ACK, originators (e.g., transmitting STAs), which have already set up DMA arrangement with the recipient, may transmit a DMA Request frame to the recipient at some pre-determined or random intervals. The recipient may then transmit a delayed multi-user ACK frame to acknowledge all packets received after receiving one or more DMA Request frames soliciting a delayed multi-user ACK frame.

The DMA Request frame may be implemented, for example, by using a block ACK action frame or any other management or control frame. The Block Ack Action field value may be set to '6' to indicate that this is a DMA Request frame if implemented as a block ACK action frame. The DMA Request frame may include a DMA Request option field to indicate whether the DMA request is for an entire group or for an individual STA, and/or a DMA option field to indicate whether the DMA request is for just regular ACK or for block ACK.

STAs may be pre-arranged into groups either autonomously or by an AP. For example, an AP may announce STA group memberships using a group ID management frame or any other management or control frames. The receiver address in the MAC header of the delayed multi-user ACK frame for a group of STAs may be either a broadcast or multicast MAC address that is mutually agreed by the STAs and the AP.

The delayed multi-user ACK frame for pre-arranged groups of STAs may be implemented using a block ACK action frame or any management or control frame. The block ACK action field value may be set to '7' to indicate that this is a delayed multi-user ACK frame for a pre-arranged group of STAs if implemented as block ACK action frame.

The delayed multi-user ACK frame for a pre-arranged group of STAs may include an ACK option field to indicate that the DMA is for a pre-arranged group of STAs and indicate whether the ACK is either a normal ACK or a block ACK. The delayed multi-user ACK frame for a pre-arranged group of STAs may also include a block ACK option field to indicate whether the block ACK for each member of the pre-arranged group is multi-TID (Multi TID), whether the block ACK for each member of the pre-arranged group is multi TID and the number K of TIDs per STA being acknowledged (Number of TIDs per STA), and/or the number N of frames that are being acknowledged per TID per member of the pre-arranged group (Number of ACKed frames per TID).

Figure 23:
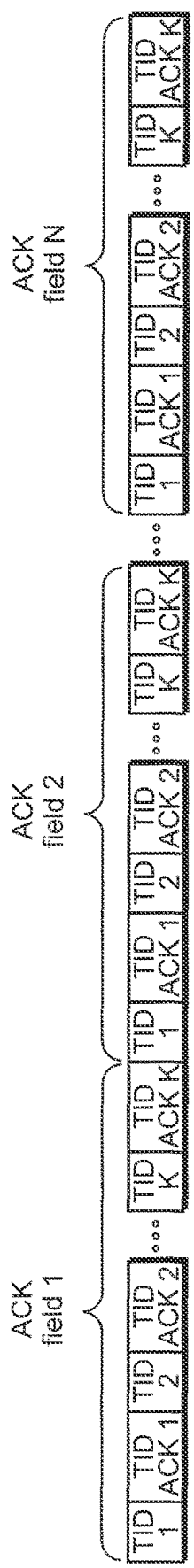
FIG. 23 shows an example of ACK fields in the delayed multi-user ACK frame for a pre-arranged group of STAs.

The delayed multi-user ACK frame for a pre-arranged group of STAs may include a field indicating the number of ACK fields. The delayed multi-user ACK frame for a pre-arranged group of STAs includes ACK fields. FIG. 23 shows an example of ACK fields in the delayed multi-user ACK frame for a pre-arranged group of STAs. The ACK fields may be arranged in the same order as the order of the STAs in the pre-arranged group. Each ACK field may comprise K (TID+TID ACK) fields. The number K is specified by Number of TIDs per STA in the block ACK option field. The TID ACK field may include a starting sequence number and a bit map of N bits each indicating an ACK for a frame for the associated TID.

A delayed multi-user ACK frame for an ad-hoc group of STAs may be implemented using a block ACK frame or any management or control frame. The delayed multi-user ACK frame for an ad-hoc group of STAs may include identification, which is a field that indicates this is a DMA frame. The block ACK action field value may be set to 7 if implemented as block ACK Action frame.

The delayed multi-user ACK frame for an ad-hoc group of STAs may include a DA field. The destination address in the MAC header in the DMA may be a multicast or a broadcast address mutually agreed by the STAs and the AP. The delayed multi-user ACK frame for an ad-hoc group of STAs may include an ACK Option field. The ACK Option field may indicate that the DMA is for ad hoc group, and may indicate whether the ACK is either a normal ACK or a block ACK.

The delayed multi-user ACK frame for an ad-hoc group of STAs may include a block ACK Options to indicate whether the block ACK for each member of the ad hoc group is multi TID (Multi TID), whether the block ACK for each member of the ad hoc group is multi TID and the number K of TIDs per STA being acknowledged (Number of TIDs per STA), and the number N of frames that are being acknowledged per TID per member of the ad hoc group (Number of ACKed frames per TID).

Figure 24:
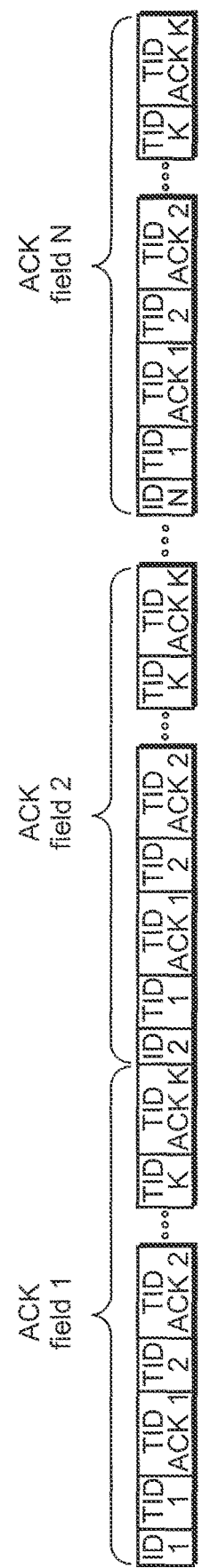
FIG. 24 shows an example of ACK fields in the delayed multi-user ACK frame for ad hoc group of STAs.

The delayed multi-user ACK frame for an ad-hoc group of STAs may include a field (Number of ACK fields) to indicate the number of ACK fields contained in the current DMA frame. The delayed multi-user ACK frame for an ad-hoc group of STAs includes an ACK field. FIG. 24 shows an example of ACK fields in the delayed multi-user ACK frame for ad hoc group of STAs. Each ACK field is for each member of the ad hoc group. Each ACK field starts with an ID field, which contains the ID of the member of the ad hoc group. The ID may be MAC address, association ID (AID) or other form of IDs that the STAs and the AP agreed upon. Each ACK field includes K (TID+TID ACK) fields. The number K is specified by Number of TIDs per STA in Block ACK option field. The TID ACK field may include a starting sequence number and a bit map of N bits each indicating an ACK for a frame for the associated TID.

Figure 25:
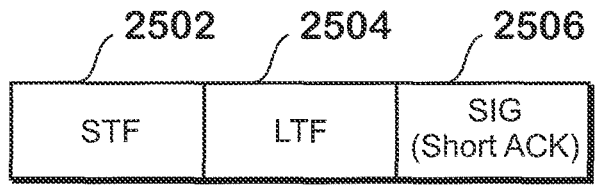
FIG. 25 shows a conventional short ACK frame format.

A short ACK frame is a shortened version of an ACK frame, which has no MAC layer fields. A short BA frame is a shortened version of a BA frame, which has no MAC layer fields. FIG. 25 shows a conventional short ACK frame format. The conventional short ACK frame includes an STF field 2502, an LTF field 2504, and an SIG field 2506. The SIG field 2506 of the short ACK frame has an indication that the frame is a short ACK frame and other indications and signaling such as ACK ID to indicate the intended receiver of the short ACK, a More Data field, and a Duration field for NAV setting. The short BA frame has the same structure as the short ACK frame. The short BA frame includes an STF field, an LTF field, and an SIG field. The SIG field of the short BA frame has an indication that the frame is a short BA frame and other indications and signaling needed for the short BA frame such as Block Ack ID to indicate the intended receiver of the BA, starting sequence control and block bitmap.

The 802.11ah standard provides a mechanism for an early ACK indication. The SIG field includes ACK indication bits (2 bits) to indicate the type of acknowledgment expected as a response to the frame to be acknowledged. The ACK indication bits are set "00" for ACK, "01" for BA, and "10" for no ACK, and "11" is currently reserved.

If a STA skips decoding a packet after PHY preamble to save power or is not able to decode the rest of the packet correctly, the STA may not be able to obtain the Duration value from the MAC header to update its NAV for medium access purposes. In such a case, the STA may defer medium access by the duration of EIFS or EIFS-DIFS+AIFS [AC] after detection of the medium being idle. DIFS is DCF inter frame space and AIFS is arbitration inter frame space (used by the QoS facility for a given access category). EIFS is defined as EIFS=SIFS+DIFS+ACK Time where ACK Time is the time required to transmit an ACK frame at the lowest physical layer supported rate.

Figure 26:
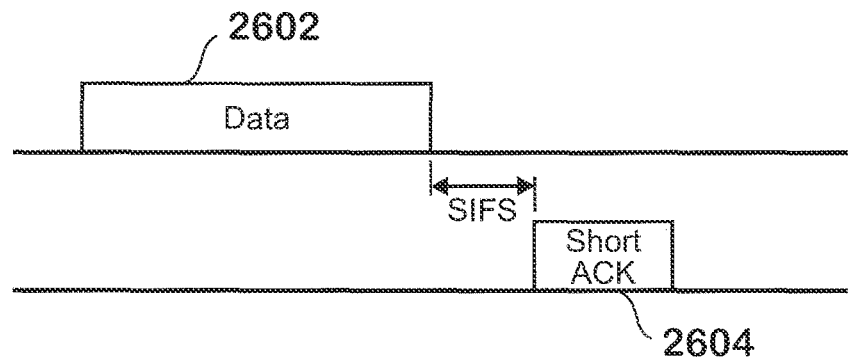
FIG. 26 shows an example of short ACK response.

In one embodiment, an originator (STA or AP) may request or indicate that a short ACK or a short BA (either the conventional format or the format shown in FIG. 2 in accordance with one embodiment disclosed above) may be sent in response to the frame by a recipient (AP or STA) instead of a regular ACK or BA. When a short ACK or short BA is used instead of a regular ACK or regular BA, respectively, the MAC protocols may be enhanced to provide increased efficiency. FIG. 26 shows an example of short ACK response. The originator sends a data frame 2602 to a recipient along with a short ACK indication in the data frame 2602, and the recipient sends a short ACK 2604 in response. The short ACK indication may be extended to a short BA indication. The originator may send a block ACK request (BAR) or an aggregated MPDU (AMPDU) with an immediate BAR along with a short BA indication, and the recipient may send a short BA in response.

The originator may convey the short ACK indication or short BA indication (hereinafter collectively "short ACK indication") by using the "10" value of the ACK indication bits in the SIG field. The ACK indication value of "10" is also used to convey "No ACK" response. These two indications may be combined in the "10" value of the ACK indication as follows. A "Short EIFS" may be specified for these two cases in place of the EIFS. For these two cases an unintended STA that does not have the Duration value from the MAC header to update its NAV may defer medium access by the duration of the Short EIFS after detection of the medium being idle. The Short EIFS may be defined as Short EIFS=SIFS+DIFS+Short ACK Time where Short ACK Time is the time required to transmit a Short ACK frame. The Short ACK Time may be defined as the addition of the time lengths of its fields (for example time lengths of STF, LTF, and SIG fields added together for 1 MHz or 2 MHz and higher bandwidth modes as the case may be). Alternatively, the Short ACK Time may be calculated as the time required for transmitting the Short ACK frame content at the lowest PHY supported rate. The short EIFS may also be defined as Short EIFS=SIFS+DIFS+Short BA Time where Short BA Time is the time required to transmit a short BA frame.

Alternatively, the originator of a frame may convey the short ACK indication in any part of the physical layer portion of the frame (e.g., in the preamble using one or more bits or a subfield in the SIG field).

Alternatively, the originator may convey the short ACK indication in a MAC portion of the frame, (e.g., in the MAC header). For example, the short ACK indication may be indicated in a control field of a MAC header or by reusing any of the existing fields or bits in the MAC header.

A device (STA or AP) that receives a frame directed to it with an indication that a short ACK or a short BA needs to be sent in response may respond with a short ACK frame or a short BA frame, respectively. The short ACK frame or short BA frame may be sent after an SIFS of receiving the frame with the short ACK or short BA indication.

The STA and the AP may indicate their capabilities and preferences of using short ACK or short BA to acknowledge packets, for example, during the association process using existing or new IE, field, subfield in the association request and association response frames.

Alternatively, a short ACK or a short BA may be the acknowledgement response that is allowed (i.e., short ACK or short BA may be used instead of the normal ACK or normal BA frame).

When a normal ACK or normal BA is used, the value in the Duration field of a frame is typically estimated by the transmitter using the lowest MCS supported by the system. This tends to overestimate the Duration and therefore leads to medium usage inefficiency since the duration field is used by unintended STAs in the system to set the NAV for medium access. When a short ACK or short BA is to be used, the transmitter (STA or AP) may set the duration value in the Duration field of the MAC header more accurately by using the time required to transmit the short ACK frame or the short BA frame. This will result in a more accurate Duration value and therefore leads to medium usage efficiency since the duration field is used by unintended STA receivers in the system to set their NAV for medium access.

The short ACK or short BA mechanism may be applied to the aggregated transmissions. An AMPDU is an aggregated MAC PDUs. A regular ACK frame or regular BA frame may be transmitted in an AMPDU. A short ACK or short BA may not be transmitted by a STA or an AP as part of an AMPDU. A short ACK or a short BA may be transmitted by a STA or an AP as part of an aggregated PPDU where several physical layer packets are aggregated to increase medium usage efficiency in reduced inter frame space (RIFS) burst where more than one packet is transmitted in succession with an RIFS spacing between the packets. The RIFS is a smaller than the SIFS.

A short CTS frame is a shortened version of a CTS frame, which has no MAC layer fields. The short CTS frame includes an STF field, an LTS field, and an SIG field. The SIG field of the short CTS frame includes an indication that the frame is a short CTS frame and other indications and signaling such as a CTS ID to indicate the intended receiver of the CTS frame, bandwidth, and Duration for NAV setting.

A transmitter (STA or AP) of a request-to-send (RTS) frame (i.e., initiator) may request or indicate that a short CTS frame should be sent in response to the RTS frame by the intended receiver (AP or STA) of the RTS frame (i.e., responder).

In one embodiment, such short CTS indication may be conveyed within an RTS frame by reusing the "10" value of the ACK indication bits in the SIG field. The ACK indication bits of "10" are also used to convey "No ACK" response. These two indications or cases may be combined in the "10" value of the ACK indication bits as follows. A "Short EIFS" may be specified for these two cases in place of the EIFS.

For these two cases, an unintended STA that does not have the Duration value from the MAC header to update its NAV may defer medium access by the duration of Short EIFS after detection of the medium being idle. The Short EIFS is defined as Short EIFS=SIFS+DIFS+Short CTS Time. The Short CTS Time may be defined as the addition of the time lengths of its fields (i.e., time lengths of STF, LTF, and SIG fields added together for 1 MHz and 2 MHz and higher bandwidth modes). Alternatively, the Short CTS Time may be calculated as the time required for transmitting the Short CTS frame content at the lowest physical layer supported rate. The Short ACK Time may be the same as a Short CTS Time and the Short ACK Time may be used in place of the Short CTS Time because the short ACK frame and the short CTS frame have the same format and length even though some of the content they carry is different.

Alternatively, the transmitter of an RTS frame (i.e., initiator) of a frame may convey the short CTS indication in any part of the physical layer portion of the frame (e.g., in the preamble using one or more bits or a subfield in the SIG field).

Alternatively, the transmitter of an RTS frame (i.e., initiator) may convey the short CTS indication in a MAC portion of the frame, (e.g., in the MAC header). For example, the short CTS indication may be indicated in a control field of a MAC header or by reusing any of the existing fields or bits in the MAC header.

A device (STA or AP) that receives an RTS frame directed to it with an indication that a short CTS needs to be sent in response may respond with a short CTS frame. The short CTS frame may be sent after an SIFS of receiving the RTS frame with the short CTS indication.

The STA and the AP may indicate their capabilities and/or preferences of using a short CTS frame to respond to an RTS frame, for example during the association process using any existing or new IE, field, subfield in the association request and association response frames.

Alternatively, a short CTS may be the response allowed for an RTS frame (i.e., a short CTS is used instead of the regular CTS frame).

When an RTS frame is sent by a device (AP or STA), the device may set the NAV for devices in its neighborhood. However, a response CTS may not be received by the neighbor devices. For example, the intended receiver (STA/AP) of the RTS frame may fail to respond with a CTS frame or there may be a failure in the reception of the CTS frame. According to the 802.11 standards, a STA that made its last NAV update based on the reception of an RTS frame may reset its NAV after a CTS timeout interval starting from the end of the reception of the RTS frame if no reception is detected during the CTS timeout interval. The CTS timeout interval is calculated as (2×SIFS)+(CTS Time)+Receiver Start Delay+(2×Slot Time) where SIFS and Slot Time are system parameters. The CTS Time is calculated using the length of the CTS frame and the data rate at which the RTS frame was received.

In one embodiment, when a device (STA or AP) transmitting an RTS frame indicates that its response frame is a short CTS frame or if a short CTS frame is the response allowed for an RTS frame, a Short CTS Timeout interval may be used instead of the CTS Timeout interval. For example, the short CTS Timeout interval may be obtained as (2×SIFS)+(short CTS Time)+Receiver Start Delay+(2×Slot Time) where SIFS and Slot Time are system parameters. The Short CTS Time may be defined as the addition of the time lengths of its fields (e.g., time lengths of STF, LTF, and SIG fields added together). Alternatively, the Short CTS Time may be calculated as the time required for transmitting the short CTS frame content at the lowest physical layer supported rate.

When a device (STA or AP) transmitting an RTS frame indicates that its response frame should be a short CTS frame or if a short CTS frame is the response allowed for an RTS frame, a Short CTS Time as described above may be used in estimating the time to set in the Duration/ID field of the RTS frame.

The 802.11ah standard has introduced a speed frame exchange protocol which is enabled by the use of a More Data field and a Response Frame field. The More Data field is a 1 bit field that indicates whether or not there is more data to be sent. The More Data field allows the responding STA to set the Response Frame field appropriately. The Response Frame field (or ACK indication bits) is a 2 bit field indicating the type of a following frame. The Response Frame field may be set to "00" for ACK, "01" for BA, "10 for No ACK, and "11" for a frame that is not ACK, CTS, or BA (i.e., it indicates that the response frame is a data frame).

Figure 27:
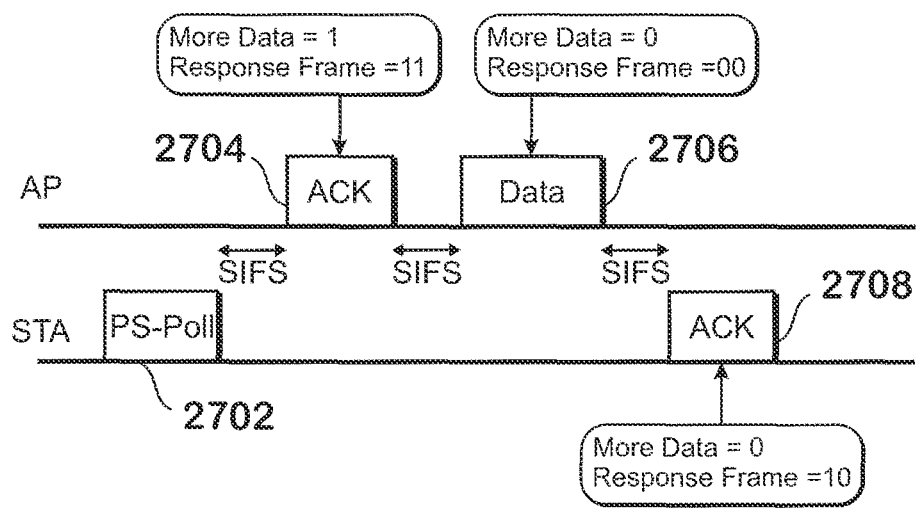
FIGS. 27 and 28 show example procedures of a speed frame exchange for downlink and uplink data, respectively.
Figure 28:
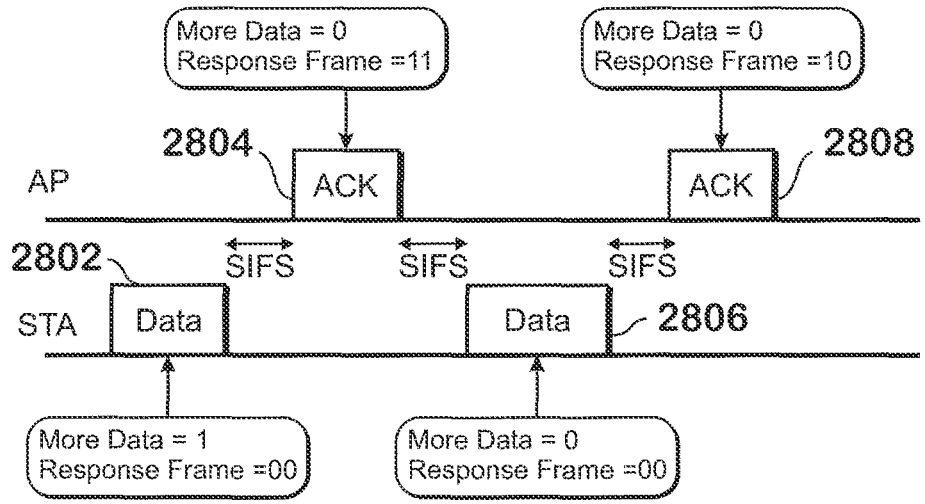

FIGS. 27 and 28 show example procedures of a speed frame exchange for downlink and uplink data, respectively. In FIG. 27, a STA sends a PS-Poll frame 2702 to an AP to retrieve data. The AP responds with an ACK 2704 with a More Data field set to '1' and a Response Frame field set to "11." The AP then sends a data frame 2706 with a More Data field set to '0' and a Response Frame set to "00." The STA receives the data frame 2706 and sends an ACK frame 2708 with a More Data field set to '0' and a Response Frame field set to "10."

In FIG. 28, a STA sends a data frame 2802 to an AP with a More Data field set to '1' and a Response Frame field set to "00." The AP then sends an ACK frame 2804 with a More Data field set to '0' and a Response Frame field set to "11." The STA then sends another data frame 2806 with a More Data field set to '0' and a Response Frame field set to "00." The AP then sends an ACK frame 2808 with a More Data field set to '0' and a Response Frame field set to "10."

In one embodiment, a short ACK frame and a short BA frame may be used in speed frame exchanges. A short ACK may be used in response to the PS-Poll frame or the data frame. A short BA frame may be used in response to an AMPDU. The SIG field of the short ACK frame and the short BA frame may include a Response Frame field (or ACK indication field) and/or a More Data field. The Response Frame field (or ACK indication field) may be used in conjunction with the More Data field of the short ACK frame or the short BA frame to conduct speed frame exchange.

Figure 29:
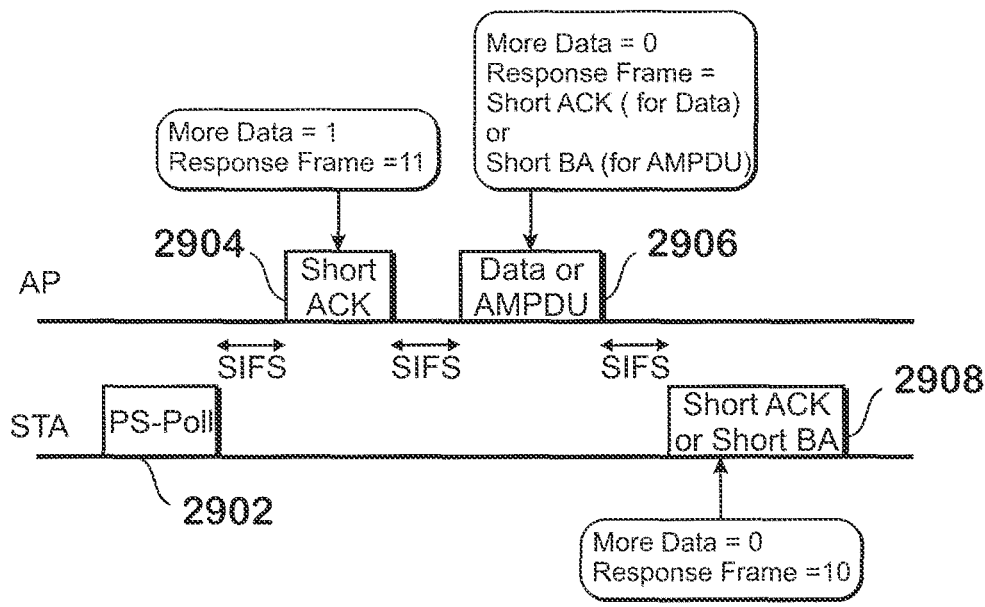
FIG. 29 shows an example of speed frame exchange using a short ACK frame (or short BA frame) for downlink data.

FIG. 29 shows an example of speed frame exchange using a short ACK frame (or short BA frame) for downlink data. A STA sends a PS-Poll frame 2902 to retrieve data from an AP. The AP responds with a short ACK frame 2904 with a More Data field set to '1' and a Response Frame field set to "11." The AP sends a data frame 2906 (or an AMPDU) with a More Data field se to '0' and a Response Frame field set to "short ACK" for non-aggregated data frame or "short BA" for aggregated data frame. The STA then responds with a short ACK (or a short BA) 2908 depending on the received data type with a More Data field set to '0' and a Response Frame field set to "10."

Figure 30:
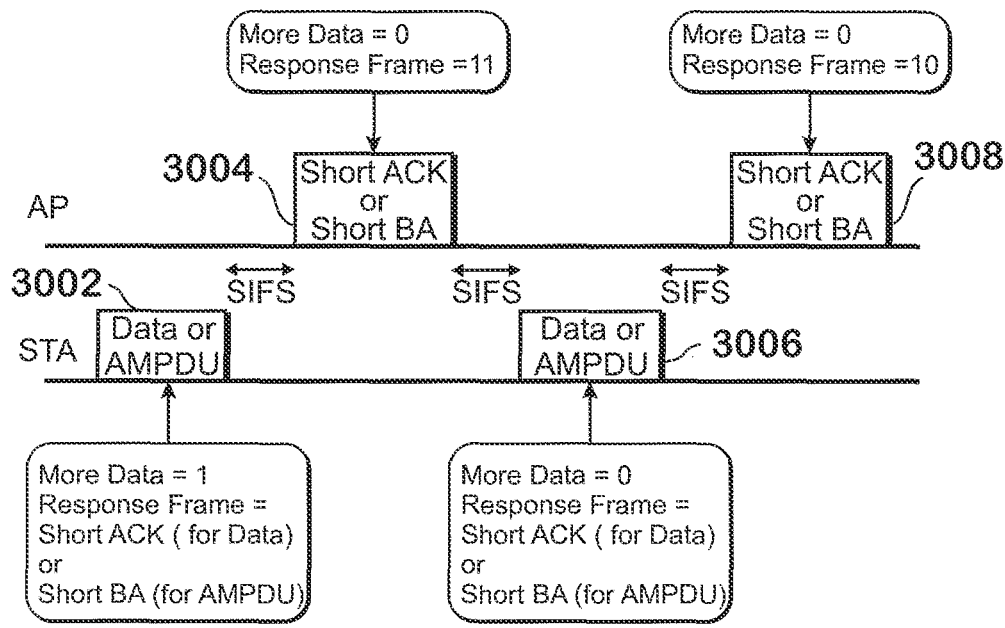
FIG. 30 shows an example of speed frame exchange using a short ACK (or short BA) frame for uplink data.

FIG. 30 shows an example of speed frame exchange using a short ACK (or short BA) frame for uplink data. A STA sends a data frame 3002 (or an AMPDU) to an AP with a More Data field set to '1' and a Response Frame field set to "short ACK" or "short BA" depending on the data type. The AP then sends a short ACK frame 3004 (or a short BA) with a More Data field set to '0' and a Response Frame field set to "11." The STA then sends another data frame 3006 (or AMPDU) with a More Data field set to '0' and a Response Frame field set to "short ACK" or "short BA." The AP then sends a short ACK frame 3008 (or short BA) with a More Data field set to '0' and a Response Frame field set to "10."

As an example, the Response Frame field (or ACK indication field) value may be set to "00" to indicate short ACK and "01" to indicate short BA, or alternatively, set to "10" to indicate short ACK and short BA.

In another embodiment, a short PS-Poll frame may be used in speed frame exchanges. The SIG field of the short PS-Poll frame may include one or both of a Response Frame field (or ACK indication field) or a More Data field. The short PS-Poll from the STA indicates that the response is a short ACK frame and also that there is more data to be transmitted.

Figure 31:
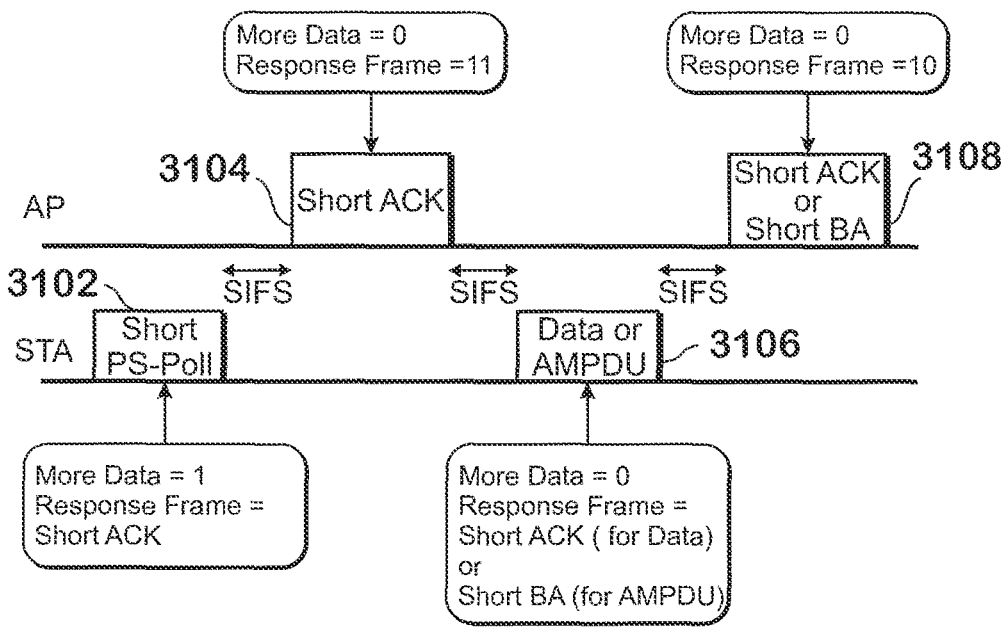
FIG. 31 shows an example of speed frame exchange using a short PS-Poll frame and a short ACK (or short BA) frame.

FIG. 31 shows an example of speed frame exchange using a short PS-Poll frame and a short ACK (or short BA) frame. A STA sends a short PS-Poll frame 3102 to retrieve data from an AP with a More Data field set to '1' and a Response Frame field set to "short ACK." The AP responds with a short ACK frame 3104 with a More Data field set to '0' and a Response Frame field set to "11." The STA sends a data frame 3106 (or an AMPDU) with a More Data field se to '0' and a Response Frame field set to "short ACK" for non-aggregated data frame or "short BA" for aggregated data frame. The AP then responds with a short ACK 3108 (or a short BA) depending on the received data type with a More Data field set to '0' and a Response Frame field set to "10."

The More Data field may be set based on whether the STA has uplink data or not. If the short PS-Poll frame is sent by the STA in an unscheduled wakeup event, then the Response Frame field may be set to indicate short ACK because the AP will most likely send an acknowledgement rather than data.

In regular MAC frames, the Duration field in the MAC header is used for setting the NAV for unintended receivers of the frame. However short frames (e.g., short ACK, short BA, short CTS) may not have the Duration field and may not carry the duration information.

In case where a STA wakes up from a sleep state and monitors the medium to receive a frame sequence to set its NAV, the STA may continue to perform clear channel assessment (CCA) until a regular frame (not a short frame) is detected with a Duration field, a short frame with duration information is detected, or the elapse of a period of time equal to the ProbeDelay that is a specified as a system parameter. If a short frame is received and if it contains a duration field or information in the SIG field, the STA may use it to set its NAV. If a short frame is received and if it does not contain a duration field or information, the STA may ignore the frame for NAV setting purposes.

In case where an unintended STA receives a short frame and the short frame does not include a duration field or information, the unintended STA may not update its NAV but retain its existing NAV setting. The existing NAV setting may have been triggered by the duration setting in the earlier frames of the frame exchange sequence (e.g., sounding frame sequence in case of a short beamforming report (BR)-Poll, data and ACK frame sequence in case of a short BA).

If the short frame has a duration field or information, the unintended STA may update its NAV based on the duration field or information if the new NAV value is greater than the current/existing NAV value.

In case an unintended STA receives a short PS-Poll frame, the unintended STA may update its NAV settings using duration required to transmit the response frame (e.g., data, ACK, short ACK) plus one SIFS interval, if the new NAV value is greater than the current NAV value. Alternatively, the unintended STA may update its NAV setting using a default response frame or response frame duration specified in the system if the response frame is not indicated in the short PS-Poll frame. Alternatively, the unintended STA may update its NAV setting using duration required to transmit the response frame (e.g., data, ACK, short ACK) indicated in the short PS-Poll frame plus one SIFS interval, if the new NAV value is greater than the current NAV value. The unintended STA may include in the duration calculation any required overhead frame or additional response frame (e.g., ACK frame) to the response frame indicated in the short PS-Poll frame and associated SIFS interval.

In one embodiment, the short frames (e.g., short BA, short BR-Poll, and short Probe Request) may include a Duration field or information in the SIG field for NAV setting. The size of the SIG field may be increased, for example, by using a higher MCS.

When a STA initiates communication with the AP using an initiating or trigger frame (e.g., PS-Poll frame or data frame), the STA may establish its transmission opportunity (TXOP) duration by setting the Duration field of its frame and thereby setting the NAV of unintended receivers/STAs. In speed frame exchange when there is downlink data transmitted by the AP and the STA is the TXOP holder or TXOP initiator, the STA may estimate the duration for the entire TXOP (entire sequence of multiple frames) initially and use that to set the duration field in the frame it transmits to set the NAV. For example, the estimate may be based on one or more of any data to transmit, expected data to be received, expected MCS to be used, and inter-frame spaces (e.g., SIFS). The STA may truncate any excess unused TXOP duration with a CF-End frame.

Alternatively, the STA may estimate the duration for its initiating or trigger frame, any required response frame(s), overhead frames and inter-frame space(s) (e.g., SIFS) and set the Duration field in its initiating/trigger frame based on the estimate. The STA may then extend the TXOP duration every time the AP indicates that there is more data (More Data field=1). The STA may not extend the TXOP duration beyond the specified TXOP duration limit for the given QoS transmission (e.g., specified by EDCA rules).

The STA may truncate a medium reservation or TXOP duration for speed frame exchange using a CF-End frame when there is no data to send or receive.

The AP sets the duration value in the frames it transmits based on the duration value in the frames it receives from the STA.

In case where an unintended STA receives a PS-Poll frame, the unintended STA may update its NAV setting using a duration required to transmit the response frame (e.g., data, ACK, short ACK) plus one SIFS interval, if the new NAV value is greater than the current NAV value. Alternatively, the unintended STA may set its NAV setting using a default response frame or response frame duration specified in the system if the response frame is not indicated in the PS-Poll frame. Alternatively, the unintended STA may set its NAV setting using a duration required to transmit the response frame (e.g., data, ACK, short ACK) indicated in the PS-Poll frame plus one SIFS interval, if the new NAV value is greater than the current NAV value. The unintended STA may include in the duration calculation any required overhead frame or additional response frame (e.g., ACK frame) to the response frame indicated in the PS-Poll frame and associated SIFS interval.

A station sends a probe request frame when it needs to obtain information from another station. Instead of a regular probe request frame, a short probe request frame may be used. The short probe request frame includes an STF field, an LTF field, and an SIG field. The SIG field of the short probe request frame includes an indication that the frame is a short probe request frame amongst other indications and signaling needed such as access network option, partial SSID and indication of whether probe response or short beacon is expected as a response to the short probe request frame.

When a STA receives a short beacon with a change sequence that is different from the STA's stored change sequence the STA may need to update its system information. The system information update may be done using a probe request frame carrying the change sequence to trigger the AP to send an optimized probe response frame including system information elements that need to be updated by the STA and the change sequence.

Since it is smaller in size, using an NDP probe request frame is more efficient than using a regular probe request frame which would occupy more medium time especially when there are a large number of STAs wanting to update system information. Power consumption at the STAs is also reduced by using the NDP probe request frame. This is especially useful when a full beacon is not transmitted frequently or a short beacon is used in the BSS.

In one embodiment, the NDP probe request frame may include the change sequence stored in the STA. This may be done, for example, by using a small size change sequence (e.g., a 4 bit sequence rather than an 8 bit sequence) that can be accommodated within the limited bits available in the SIG field.

The NDP probe request frame may indicate what system information elements are needed by the STA (e.g., a bit map representing the subset of system information elements). The NDP probe request frame may indicate that the change sequence in the last received short beacon is different than the change sequence stored in the STA.

The NDP probe request frame may indicate which set of predefined system information elements are needed by the STA. The sets of predefined system information elements may be indexed and the index representing a set of system information may be signaled in the NDP probe request frame. For example, a predefined set of system information elements may be a set of system information elements or fields containing mandatory information such as timestamp, beacon interval, and capability; a set of system information elements or fields containing other information such as EDCA parameters, Quiet element, BSS load, channel switch announcement, HT operation element, VHT operation element; or a set of system information elements or fields containing any combination of mandatory information and other information. For example, the above signaling may be implemented by using one or more bits of the reserved bits in the SIG field of the NDP probe request frame.

When a STA sends an NDP probe request frame including the change sequence stored in the STA, the AP may send an optimized probe response frame including system information elements that need to be updated by the STA and the change sequence. The AP is able to do this by storing the previous change sequences and the corresponding changed system information element's IDs. The AP finds the updated information to send by comparing the received change sequence from the STA with its stored previous change sequences.

When a STA sends an NDP probe request frame indicating what system information elements are needed, the AP may send an optimized probe response frame including system information elements that need to be updated by the STA and the change sequence.

When a STA sends an NDP probe request frame indicating which set of predefined system information elements are needed, the AP may send an optimized probe response frame including the indicated set of predefined system information elements and the change sequence.

When a STA sends an NDP probe request frame indicating that the change sequence in the last received short beacon is different than the change sequence stored in the STA, the AP may send an optimized probe response frame including a predefined or basic set of system information elements that need to be updated by the STA and the change sequence.

In any embodiments above, the response to the NDP probe request frame may be a short probe response frame that includes the information requested or indicated in the NDP probe request frame.

An NDP PS-Poll frame may be used for active polling. The NDP PS-Poll frame includes an STF field, an LTF field, and an SIG field. The SIG field of the short PS-Poll frame has an indication that the frame is a short PS-Poll frame and other indications or signaling needed for the short PS-Poll frame such as AID or partial AID of the transmitting STA, BSSID or partial BSSID of the BSS in which the STA is associated, and preferred MCS for the STA to receive data from the AP.

The NDP PS-Poll frame may include signaling to request a BSS change sequence and/or current timestamp. The signaling may be included in the SIG field of the NDP PS-Poll frame. One or more bits of the SIG field may be used to indicate a change sequence request and/or a current timestamp request from the AP. One or more bits of the SIG field may be used to indicate whether one or more of the following fields are included: preferred MCS, a change sequence request, and a current timestamp request.

When a STA sends an NDP PS-Poll frame containing a request for BSS change sequence, the AP may send the BSS change sequence immediately in a response frame or indicate in the response frame to the STA that it should check the beacons. When a STA sends an NDP PS-Poll frame containing a request for the current timestamp, the AP may send the current timestamp immediately in a response frame or indicate in the response frame to the STA that it should check the beacons.

Any of the frames from the AP that are transmitted in response to the PS-Poll frame such as ACK or data may carry the requested information from the AP. Alternatively, a new response frame from the AP may be defined for the PS-Poll frame to carry the requested information from the AP. This frame may be of any type such as management, control, or data.

Although the embodiments are described herein with respect to IEEE 802.11 protocols, it should be understood that the embodiments are applicable to any wireless communication systems. Although SIFS is used as an inter-frame spacing in various embodiments, all other inter frame spacing such as RIFS or other agreed time interval may also be used.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a first station (STA), the method comprising:
receiving, from a second STA, one or more data frames;
receiving, from the second STA, a multi-user acknowledgement request frame configured to solicit a block acknowledgement frame associated with the one or more data frames, wherein the multi-user acknowledgement request frame is configured to indicate that a solicited response is a block acknowledgement frame, and wherein the multi-user acknowledgement request frame is configured for a plurality of STAs; and
in response to a determination that the multi-user acknowledgement request frame is directed to the first STA, transmitting the block acknowledgement frame, wherein the block acknowledgement frame is configured to acknowledge receipt of the one or more data frames received by the first STA.

2. The method of claim 1, wherein the second STA is an access point (AP).

3. The method of claim 1, wherein the multi-user block acknowledgement frame comprises an identifier for each of the plurality of STAs for which the receipt of the one or more data frame is to be acknowledged.

4. The method of claim 1, wherein the one or more data frames are included in a medium access control (MAC) protocol data unit (PDU).

5. A first station (STA) comprising:
a transceiver; and
a processor configured to:
receive, from a second STA, via the transceiver, one or more data frames:
receive, from the second STA via the transceiver, a multi-user acknowledgement request frame configured to solicit a block acknowledgement frame, wherein the multi-user acknowledgement request frame is configured to indicate that a solicited response is a block acknowledgement frame, and wherein the multi-user acknowledgement request frame is configured for a plurality of STAs; and
in response to a determination that the multi-user acknowledgement request frame is directed to the first STA, transmit, via the transceiver, the block acknowledgement frame, wherein the block acknowledgement frame is configured to acknowledge receipt of one or more data frames packets by the first STA.

6. The first STA of claim 5, wherein the multi-user acknowledgement request frame indicates that the solicited response is a block acknowledgement.

7. The first STA of claim 5, wherein the second STA is an access point (AP).

8. The first STA of claim 5, wherein the multi-user block acknowledgement frame comprises an identifier for each of the plurality of STAs for which the receipt of the one or more data frame is to be acknowledged.

9. The first STA of claim 5, wherein the one or more data frames are included in a medium access control (MAC) protocol data unit (PDU).

10. A method performed by a first station (STA), the method comprising:
transmitting, to each STA of a plurality of STAs, one or more data frames;
transmitting a multi-user acknowledgement request frame configured to solicit a block acknowledgement frame, wherein the multi-user acknowledgement request frame is configured to indicate that a solicited response is a block acknowledgement frame, wherein the multi-user bleekacknowledgement request frame is configured for a plurality of STAs; and
receiving, from a second STA of the plurality of STAs in response to the multi-user acknowledgement request frame, the block acknowledgement frame, wherein the block acknowledgement frame is configured to acknowledge receipt of the one or more data frames by the second STA.

11. The method of claim 10, wherein the first second STA is an access point (AP).

12. The method of claim 10, wherein the multi-user block acknowledgement frame comprises an identifier for each of the plurality of STAs for which the receipt of the one or more data frames the plurality of packets is to be being acknowledged.

13. The method of claim 10, wherein the one or more data frames are included in a medium access control (MAC) protocol data unit (PDU).

14. A first station (STA) comprising:
a transceiver; and
a processor configured to:
transmit, via the transceiver to a plurality of STAs, one or more data frames;
transmit, via the transceiver, a multi-user acknowledgement request frame configured to solicit a block acknowledgement frame, wherein the multi-user acknowledgement request frame is configured to indicate that a solicited response is a block acknowledgement frame, wherein the multi-user acknowledgement request frame is configured for a plurality of STAs; and
receive, from a second STA of the plurality of STAs in response to the multi-user acknowledgement request frame, the block acknowledgement frame, wherein the block acknowledgement frame is configured to acknowledge receipt of the one or more data frames by the second STA.

15. The first STA of claim 14, wherein the first STA is an access point (AP).

16. The first station of claim 14, wherein the multi-user acknowledgement request frame is configured for a plurality of STAs.

17. The first station of claim 14, wherein the multi-user block acknowledgement frame comprises an identifier for each of the plurality of STAs for which the receipt of the one or more data frames is to be acknowledged.

18. The first STA of claim 14, wherein the one or more data frames are included in a medium access control (MAC) protocol data unit (PDU).

19. At least one non-transitory computer-readable storage medium comprising executable instructions for configuring at least one processor to:

receive one or more data frames at a first station (STA);

receive, from a second STA, a multi-user acknowledgement request frame configured to solicit a block acknowledgement frame, wherein the multi-user acknowledgement request frame is configured to indicate that a solicited response is a block acknowledgement frame, and wherein the multi-user acknowledgement request frame is configured for a plurality of stations (STAs); and in response to a determination that the multi-user acknowledgement request frame is directed to a first STA, transmit the block acknowledgement frame, wherein the block acknowledgement frame is configured to acknowledge receipt of the one or more data frames packets received by the first STA.

20. At least one non-transitory computer-readable storage medium comprising executable instructions for configuring at least one processor to:

transmit, to each station (STA) of a plurality of STAs, a plurality of packets;

transmit a multi-user acknowledgement request frame configured to solicit a multi-user block acknowledgement frame, wherein the solicited multi-user block acknowledgement frame is configured to acknowledge receipt of one or more aggregated packets by the plurality of STAs; and receive, from a second STA of the plurality of STAs in response to the multi-user acknowledgement request frame, the multi-user block acknowledgement frame.

* * * * *

UNITED STATES PATENT AND TRADEMARK OFFICE
CERTIFICATE OF CORRECTION

PATENT NO. : 12,170,631 B2  
APPLICATION NO. : 17/392933  
DATED : December 17, 2024  
INVENTOR(S) : Hanqing Lou et al.

It is certified that error appears in the above-identified patent and that said Letters Patent is hereby corrected as shown below:

In the Claims

In Claim 3: Column 29, Line 37 delete "acknowledgement frame comprises an identifier for each of" and insert --acknowledgement request frame comprises an identifier for each of--.

In Claim 5: Column 29, Line 47 delete "more data frames:" and insert --more data frames;--.

In Claim 5: Column 29, Line 61 delete "edge receipt of one or more data frames packets by" and insert --edge receipt of the one or more data frames packets by--.

In Claim 8: Column 30, Line 61 delete "data frame is to be acknowledged." and insert --data frames is to be acknowledged.--.

In Claim 12: Column 30, Line 30 delete "data frames the plurality of packets is to be being" and insert --data frames is to be--.

In Claim 19: Column 31, Line 15 delete "frames packets received by the first STA." and insert --frames received by the first STA.--.

Signed and Sealed this  
Twenty-fifth Day of February, 2025

Coke Morgan Stewart  
*Acting Director of the United States Patent and Trademark Office*